(12) United States Patent
Kondo

(10) Patent No.: US 10,366,303 B2
(45) Date of Patent: Jul. 30, 2019

(54) IMAGE PROCESSING DEVICE AND IMAGE PROCESSING METHOD

(71) Applicant: SONY CORPORATION, Tokyo (JP)

(72) Inventor: Yuhi Kondo, Tokyo (JP)

(73) Assignee: SONY CORPORATION, Tokyo (JP)

( * ) Notice: Subject to any disclaimer, the term of this patent is extended or adjusted under 35 U.S.C. 154(b) by 51 days.

(21) Appl. No.: 15/032,195

(22) PCT Filed: Nov. 17, 2014

(86) PCT No.: PCT/JP2014/080324
§ 371 (c)(1),
(2) Date: Apr. 26, 2016

(87) PCT Pub. No.: WO2015/093206
PCT Pub. Date: Jun. 25, 2015

(65) Prior Publication Data
US 2016/0267348 A1    Sep. 15, 2016

(30) Foreign Application Priority Data

Dec. 16, 2013    (JP) .................................. 2013-259076

(51) Int. Cl.
*G02B 5/30* (2006.01)
*G06K 9/00* (2006.01)
(Continued)

(52) U.S. Cl.
CPC ......... *G06K 9/4671* (2013.01); *G02B 5/3025* (2013.01); *G02B 27/286* (2013.01);
(Continued)

(58) Field of Classification Search
None
See application file for complete search history.

(56) References Cited

U.S. PATENT DOCUMENTS

2012/0268602 A1    10/2012    Hirai et al.
2013/0136306 A1*    5/2013    Li .......................... G02B 27/28
382/103

(Continued)

FOREIGN PATENT DOCUMENTS

CN    101558282 A    10/2009
CN    102782720 A    11/2012
(Continued)

OTHER PUBLICATIONS

Mo-gen Xue, Feng Wang, Guo-ming Xu, Hong-wu Yuan, "Polarization imaging detection technology research", Proc. SPIE 8907, International Symposium on Photoelectronic Detection and Imaging 2013: Infrared Imaging and Applications, 89075F (Sep. 11, 2013); doi: 10.1117/12.2035009.*

(Continued)

*Primary Examiner* — Kim Y Vu
*Assistant Examiner* — Nathan J Bloom
(74) *Attorney, Agent, or Firm* — Paratus Law Group, PLLC

(57) ABSTRACT

A polarization image acquisition unit (11) acquires polarization images of three or more polarization directions. A feature quantity computation unit (15) computes image feature quantities on the basis of the acquired polarization images. For example, the luminance of each polarization image is normalized for each pixel, and the normalized luminance of the polarization image is used as the image feature quantity. The luminance of the polarization image changes according to the surface shape of an object. Thus, the image feature quantities computed on the basis of the polarization images are feature quantities corresponding to the surface shape of the object. Image processing, for example, image recognition, feature point detection, feature point matching, or the like, can be performed on the basis of (Continued)

the surface shape of the object using such image feature quantities.

13 Claims, 27 Drawing Sheets

(51) Int. Cl.
| | |
|---|---|
| *G06K 9/20* | (2006.01) |
| *G06K 9/46* | (2006.01) |
| *G06T 7/73* | (2017.01) |
| *G02B 27/28* | (2006.01) |

(52) U.S. Cl.
CPC ......... *G06K 9/00255* (2013.01); *G06K 9/209* (2013.01); *G06K 9/2036* (2013.01); *G06K 9/4661* (2013.01); *G06T 7/73* (2017.01); *G06T 2207/10141* (2013.01)

(56) References Cited

U.S. PATENT DOCUMENTS

| | | | |
|---|---|---|---|
| 2016/0261852 A1* | 9/2016 | Hirasawa | G01B 11/24 |
| 2018/0005012 A1* | 1/2018 | Aycock | G02B 5/201 |
| 2018/0181839 A1* | 6/2018 | Hoover | G01N 21/21 |

FOREIGN PATENT DOCUMENTS

| | | |
|---|---|---|
| EP | 2072947 A1 | 6/2009 |
| JP | 2000-002651 | 1/2000 |
| JP | 2011-150686 | 8/2011 |
| JP | 2011-150689 | 8/2011 |
| JP | 2012-510064 | 4/2012 |
| JP | 2013-030889 | 2/2013 |
| WO | WO2008/099589 A1 | 8/2008 |

OTHER PUBLICATIONS

Perkins, Robert, and Viktor Gruev. "Signal-to-noise analysis of Stokes parameters in division of focal plane polarimeters." Optics express 18.25 (Dec. 2010): 25815-25824.*
Wolff, et al., "Constraining Object Features Using a Polarization Reflectance Model", IEEE Transactions on Pattern Analysis and Machine Intelligence, Jul. 1991, pp. 635-657, vol. 13—No. 7, IEEE.
Atkinson, et al., "Recovery of Surface Orientation From Diffuse Polarization", IEEE Transactions on Image Processing, Jun. 2006, pp. 1653-1664, vol. 15—No. 6, IEEE.
Jun. 21, 2017, EP communication issued for related EP application No. 14871081.7.
Sep. 20, 2018, Chinese Office Action issued for related CN application No. 201480067376.2.
Fang et al., Scene Segmentation of Hazy Image Using Polarization Measurements, ACTA Photonica Sinica, Dec. 2011, pp. 1820-1826, vol. 40, No. 12.

* cited by examiner

FIG. 11
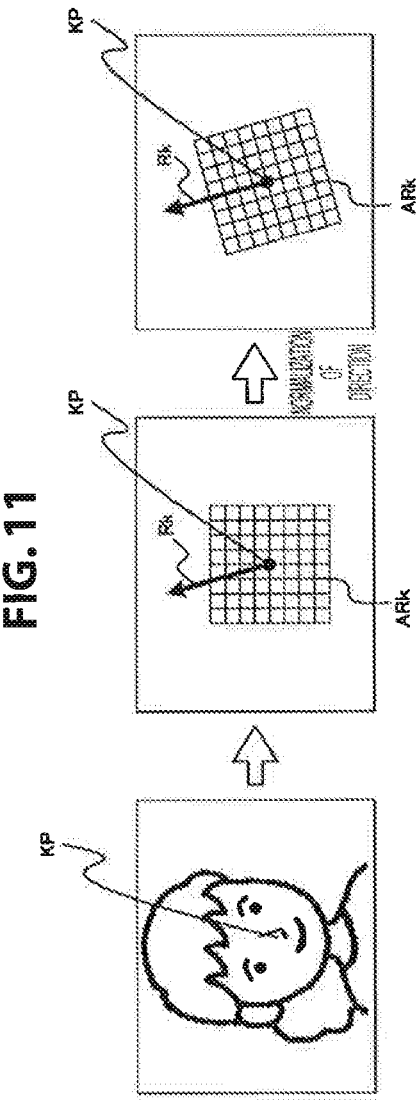
(A)
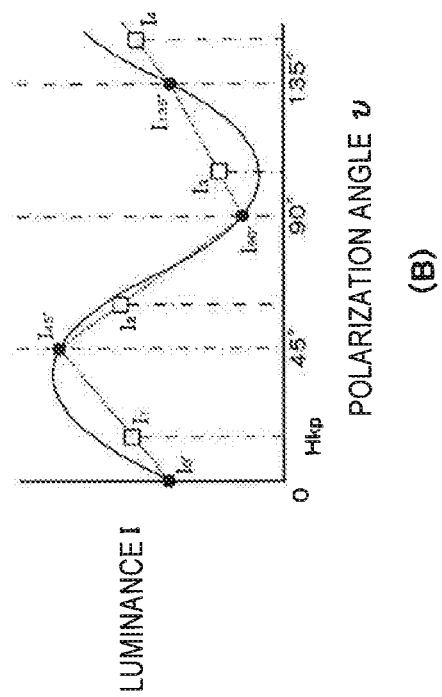
(B)

FIG. 13
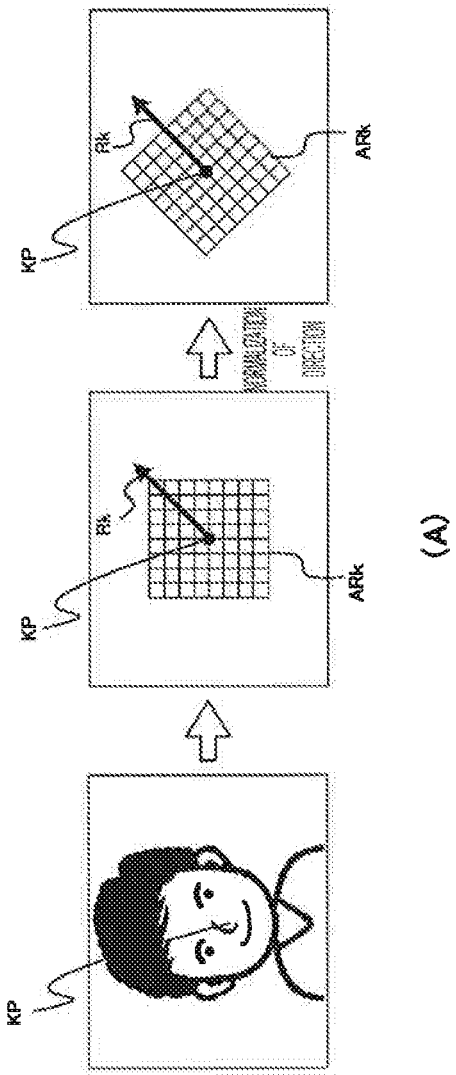
(A)
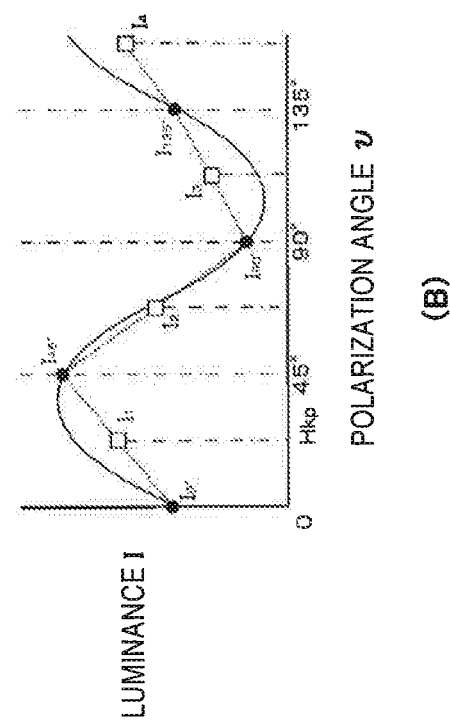
(B)

FIG.21

| | | |
|---|---|---|
| PHYSICAL OBJECT RECOGNITION | GENERAL PHYSICAL OBJECT RECOGNITION | IT IS RECOGNIZED WHETHER VARIOUS PHYSICAL OBJECTS ARE INCLUDED IN SCENE. |
| | RECOGNITION OF QUALITY OF MATERIAL OR SURFACE SHAPE | BECAUSE POLARIZATION FEATURE QUANTITY HAS INFORMATION OF SURFACE SHAPE, RECOGNITION OF QUALITY OF MATERIAL IS ALSO POSSIBLE. |
| | RECOGNITION OF METAL | POLARIZATION FEATURE QUANTITY OF METAL HAS SPECIAL VALUE. |
| FACE RECOGNITION | PERSONAL AUTHENTICATION | BECAUSE MINUTE SHAPE ACCORDING TO TILT OF SURFACE CAN BE ACQUIRED FROM ALL PIXELS, USE IN RECOGNITION OF PERSONAL AUTHENTICATION LEVEL IS ALSO POSSIBLE. IDENTIFICATION OF FACE SHOWN IN PHOTO AND ACTUAL FACE IS ALSO POSSIBLE. |
| | FACIAL EXPRESSION RECOGNITION | BECAUSE MINUTE SHAPE OF FACE CAN BE ACQUIRED, RECOGNITION OF FACIAL EXPRESSION IS ALSO POSSIBLE. |
| | LINE-OF-SIGHT DIRECTION ESTIMATION | BECAUSE NORMAL INFORMATION IS INCLUDED, LINE OF SIGHT IS ALSO RECOGNIZABLE. |
| HAND RECOGNITION | FINGER SHAPE DETECTION | MINUTE SHAPE OF FINGER IS ALSO ACQUIRABLE BY ACQUIRING SURFACE SHAPE. |
| | POINTING DIRECTION ESTIMATION | POINTING DIRECTION IS RECOGNIZABLE. |
| HUMAN RECOGNITION | AUTHENTICATION OF FIGURE OF WHOLE BODY | PERSONAL AUTHENTICATION FROM HEIGHT, BODY BUILD, ETC. |
| | POSE RECOGNITION | HUMAN POSE IS AUTHENTICATED. |

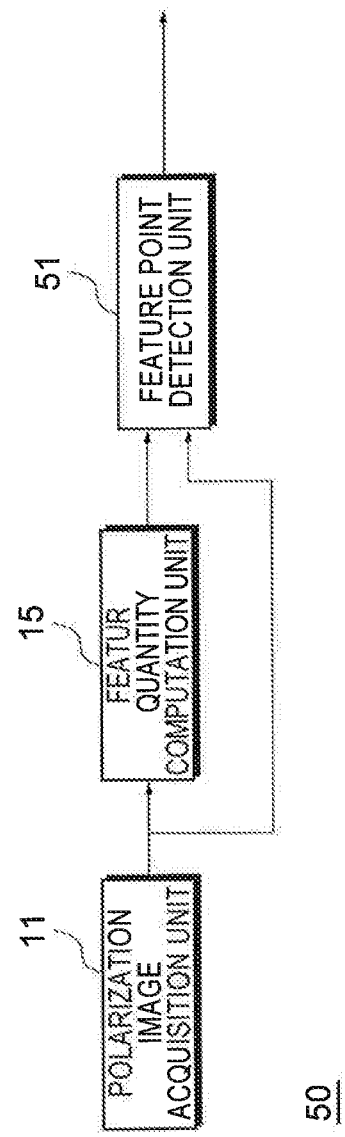

(A)

(B)

IMAGE PROCESSING DEVICE AND IMAGE PROCESSING METHOD

CROSS REFERENCE TO PRIOR APPLICATION

This application is a National Stage Patent Application of PCT International Patent Application No. PCT/JP2014/080324 (filed on Nov. 17, 2014) under 35 U.S.C. § 371, which claims priority to Japanese Patent Application No. 2013-259076 (filed on Dec. 16, 2013), which are all hereby incorporated by reference in their entirety.

TECHNICAL FIELD

The present technology relates to an image processing device and an image processing method, and is provided to perform image processing based on an object surface shape.

BACKGROUND ART

Conventionally, normal information of an object is acquired from polarization images of a plurality of polarization directions. For example, in Non-Patent Literature 1 and Non-Patent Literature 2, normal information is computed by applying polarization images of a plurality of polarization directions to a model expression. Also, recognition or the like of an object is performed using the polarization images. For example, in Patent Literature 1, an illuminating means is arranged so that illumination light serves as p-polarized light to a predetermined reference surface and illuminates an object. Further, in Patent Literature 1, an intensity of light of each polarized light component is measured by separating reflected light from the reference surface into s-polarized light and p-polarized light and the object is identified on the basis of an obtained measurement result of the intensity of light while the object to be measured moves along the reference surface.

CITATION LIST

Patent Literature

Patent Literature 1: JP 2011-150689A

Non-Patent Literature

Non-Patent Literature 1: Lawrence B. Wolff and Terrance E. Boult: "Constraining Object Features Using a Polarization Reflectance Model," IEEE Transaction on pattern analysis and machine intelligence, Vol. 13, No. 7, July 1991

Non-Patent Literature 2: Gary A. Atkinson and Edwin R. Hancock: "Recovery of surface orientation from diffuse polarization," IEEE Transactions of Image Processing, Vol. 15, Issue. 6, pp. 1653-1664, 2006

SUMMARY OF INVENTION

Technical Problem

When normal information is computed by applying polarization images of a plurality of polarization directions to a model expression, a relation between the polarization direction and the luminance of the polarization image has a periodicity of 180 degrees. For example, the luminance of the polarization image becomes the same between 0 degrees and 180 degrees and the luminance of the polarization image is the same at 45 degrees and at 225 degrees. Accordingly, a problem of the so-called uncertainty of 180 degrees remains when an azimuth angle of the normal direction is obtained. Also, although a difference between surface materials of the object can be identified in identification using the s-polarized light and the p-polarized light, it is not possible to theoretically identify a surface shape of the object from two polarization directions.

Therefore, an objective of the present technology is to provide an image processing device and an image processing method capable of performing image processing based on a surface shape of an object.

Solution to Problem

A first aspect of the present technology resides in an image processing device including: a polarization image acquisition unit configured to acquire a polarization image; and an image processing unit configured to perform image processing using an image feature quantity computed on the basis of the polarization image acquired by the polarization image acquisition unit.

In the present technology, for example, polarization images of three or more polarization directions are acquired and image processing such as an object recognition process, detection of a feature point of an object, or a matching process with the feature point of the object is performed using an image feature quantity computed for each pixel on the basis of luminances of the acquired polarization images. The luminance is normalized in the computation of the image feature quantity and the normalized luminance of each polarization direction is used as an image feature quantity. Also, the image feature quantity is computed for each pixel and an image feature quantity of a pixel positioned near the feature quantity target pixel is also used in the computation of the image feature quantity of the feature quantity computation target pixel. Further, in the computation of the image feature quantity, the image feature quantity is computed according to a ratio between a diffuse reflection component and a specular reflection component on the basis of reflection characteristics of an object in the polarization image. Also, in the computation of the image feature quantity, the computation of the image feature quantity based on the polarization image and a refractive index of the object in the polarization image is performed. Also, there is further provided a non-polarization image feature quantity computation unit configured to generate a non-polarization image from the acquired polarization image and compute a feature quantity on the basis of the non-polarization image, wherein the image feature quantity is computed using information based on a gradient strength and a gradient direction determined when the non-polarization image feature quantity computation unit computes the feature quantity. Also, the image feature quantity computed by the non-polarization image feature quantity computation unit is also included in the computed image feature quantity.

A second aspect of the present technology resides in an image processing method including the steps of: acquiring, by a polarization image acquisition unit, a polarization image; and performing, by an image processing unit, image processing using an image feature quantity computed on the basis of the polarization image acquired by the polarization image acquisition unit.

Advantageous Effects of Invention

According to the technology, a polarization image is acquired and image processing is performed using an image feature quantity computed on the basis of the acquired polarization image. Thus, from the fact that the image feature quantity is computed on the basis of the polarization image, a feature of a surface shape of an object can be indicated by the image feature quantity and image processing based on the surface shape of the object is configured to be performed using the image feature quantity. Also, the effects disclosed in the present specification are only illustrative and not limiting and there may be additional effects.

BRIEF DESCRIPTION OF DRAWINGS

FIG. 11 is a diagram for describing an operation of a feature quantity computation unit when a non-polarization image feature quantity computation unit computes an SIFT feature quantity.

FIG. 13 is a diagram for describing an operation of the feature quantity computation unit when the non-polarization image feature quantity computation unit computes an SURF feature quantity.

FIG. 21 is a diagram illustrating the recognition process.

FIG. 22 is a diagram illustrating a configuration when the image processing device detects a feature point.

DESCRIPTION OF EMBODIMENTS

Hereinafter, modes for carrying out the present technology will be described. In addition, description will be provided in the following order.

1. Configuration and operation of image feature quantity computation device
   1-1. Configuration of image feature quantity computation device
   1-2. Operation of image feature quantity computation device
   1-3. Other operation of image feature quantity computation device
2. Other configuration and operation of image feature quantity computation device
   2-1. Other configuration of image feature quantity computation device
   2-2. Operation of other configuration of image feature quantity computation device
3. Configuration and operation of image processing device
   3-1. Recognition process
   3-2. Feature point detection
   3-3. Feature point matching <1. Configuration and Operation of Image Feature Quantity Computation Device>

[1-1. Configuration of Image Feature Quantity Computation Device]

Figure 1:
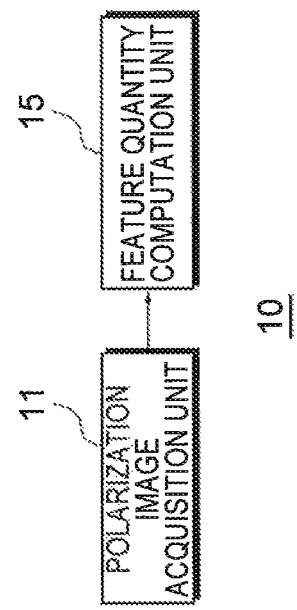
FIG. 1 is a diagram illustrating a configuration of an image feature quantity computation device.

FIG. 1 illustrates a configuration of an image feature quantity computation device for computing an image feature quantity. The image feature quantity computation device 10 includes a polarization image acquisition unit 11 and a feature quantity computation unit 15.

The polarization image acquisition unit 11 acquires polarization images of three or more polarization directions. The polarization image acquisition unit 11 may be a component having an imaging unit configured to generate the polarization images of the three or more polarization directions or may be a component configured to acquire the polarization images of the three or more polarization directions from an external device, a recording medium, or the like.

The feature quantity computation unit 15 computes an image feature quantity on the basis of the polarization images acquired by the polarization image acquisition unit 11.

[1-2. Operation of Image Feature Quantity Computation Device]

Figure 2:
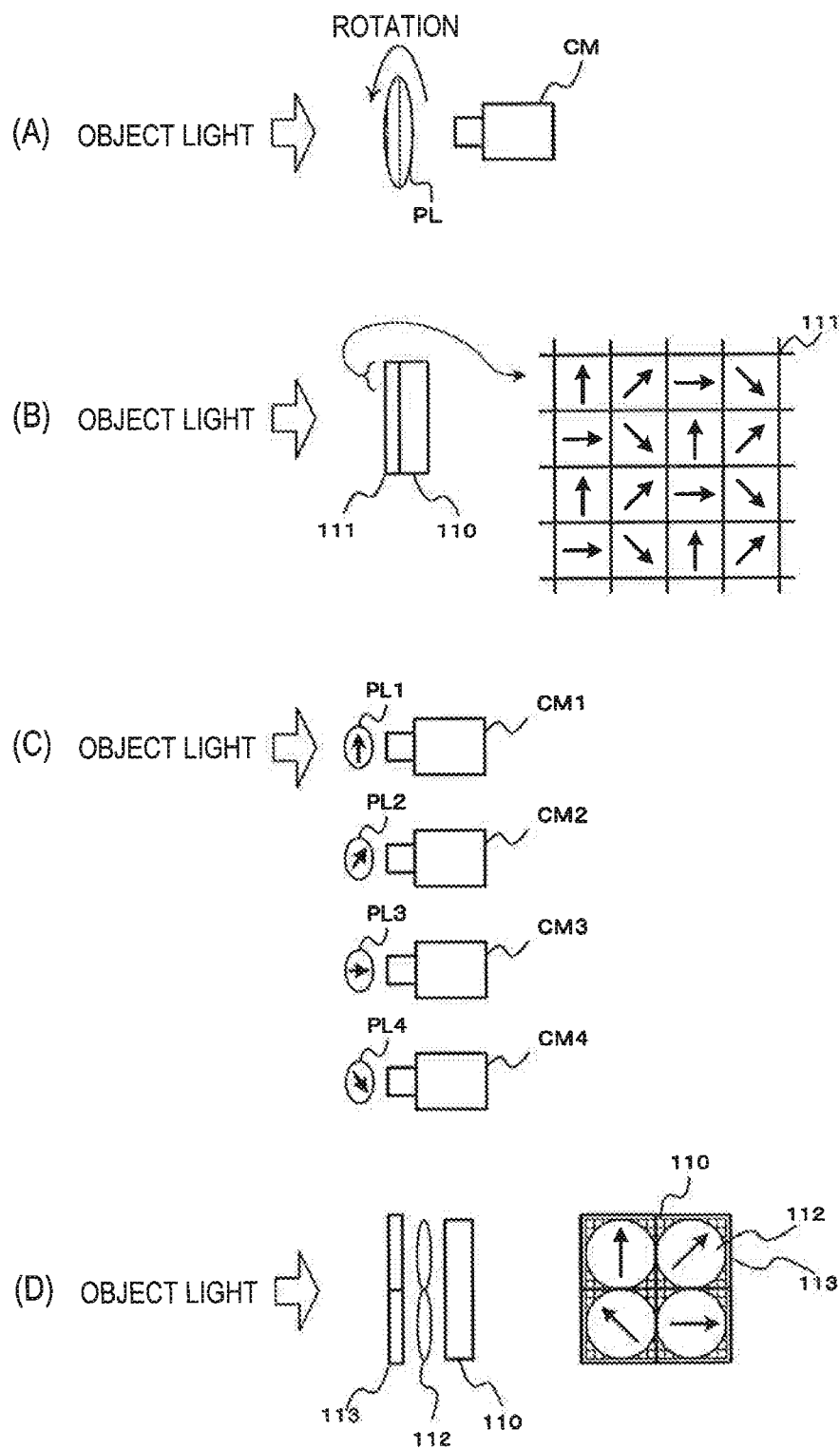
FIG. 2 is a diagram for describing a polarization image acquired by a polarization image acquisition unit.

FIG. 2 is a diagram for describing a polarization image acquired by the polarization image acquisition unit. For example, as illustrated in (A) of FIG. 2, the polarization image is generated by performing imaging in each of the three or more polarization directions by rotating a polarizing plate PL provided in front of an imaging unit CM. Also, as illustrated in (B) of FIG. 2, the polarization image may be generated by performing imaging after arranging a polarization filter 111 having pixel components of the three or more polarization directions in an image sensor 110. Also, in (B) of FIG. 2, the case in which the polarization filter 111 having any pixels of four different types of polarization directions (the polarization directions are indicated by arrows) is arranged in a front surface of the image sensor 110 is illustrated. Also, as illustrated in (C) of FIG. 2, the polarization images may be generated by sequentially performing imaging from the same position using imaging units CM1 to CM4 after providing polarization plates PL1 to PL4 having different polarization directions in front of the imaging units CM1 to CM4. Further, as illustrated in (D) of FIG. 2, a plurality of polarization images of different polarization directions may be generated using a configuration of a multi-lens array. For example, an optical image of an object is formed on an imaging plane of the image sensor 110 using each lens 112 by providing a plurality of lenses (four lenses in (D) of FIG. 2) in a front surface of the image sensor 110. Also, polarizing plates 113 are provided in front surfaces of the lenses 112 and polarization directions of the polarizing plates 113 are configured to be different directions. According to this configuration, the image sensor 110 can generate polarization images of different polarization directions.

Also, when no color filter is used in the imaging unit, the polarization image acquisition unit 11 can acquire a luminance polarization image. Here, in (A) and (C) of FIG. 2, it is possible to acquire an image equivalent to a non-polarization 16 normal luminance image by averaging luminances of luminance polarization images for which a polarization direction differs according to each pixel. Also, in the case of (B) of FIG. 2, it is possible to acquire an image equivalent to the non-polarization normal luminance image by averaging luminances of four adjacent pixels having different polarization directions. Also, in the case of (D) of FIG. 2, an image equivalent to the non-polarization normal luminance image can be acquired by averaging luminances of polarization images of different polarization directions because parallax can be ignored in a plurality of polarization images of different polarization directions if the distance between the lenses 112 is short to an extent to which a distance between the lenses 112 can be ignored with respect to a distance to the object. Also, if polarization images of different polarization directions are aligned according to an amount of parallax and luminances of the aligned polarization images are averaged when it is not possible to ignore the parallax, an image equivalent to the non-polarization normal luminance image can be acquired. Further, the polarization image acquisition unit 11 may simultaneously generate three-primary-color images by providing color filters in the imaging unit as well as the luminance polarization image or simultaneously generate infrared images, etc.

Figure 3:
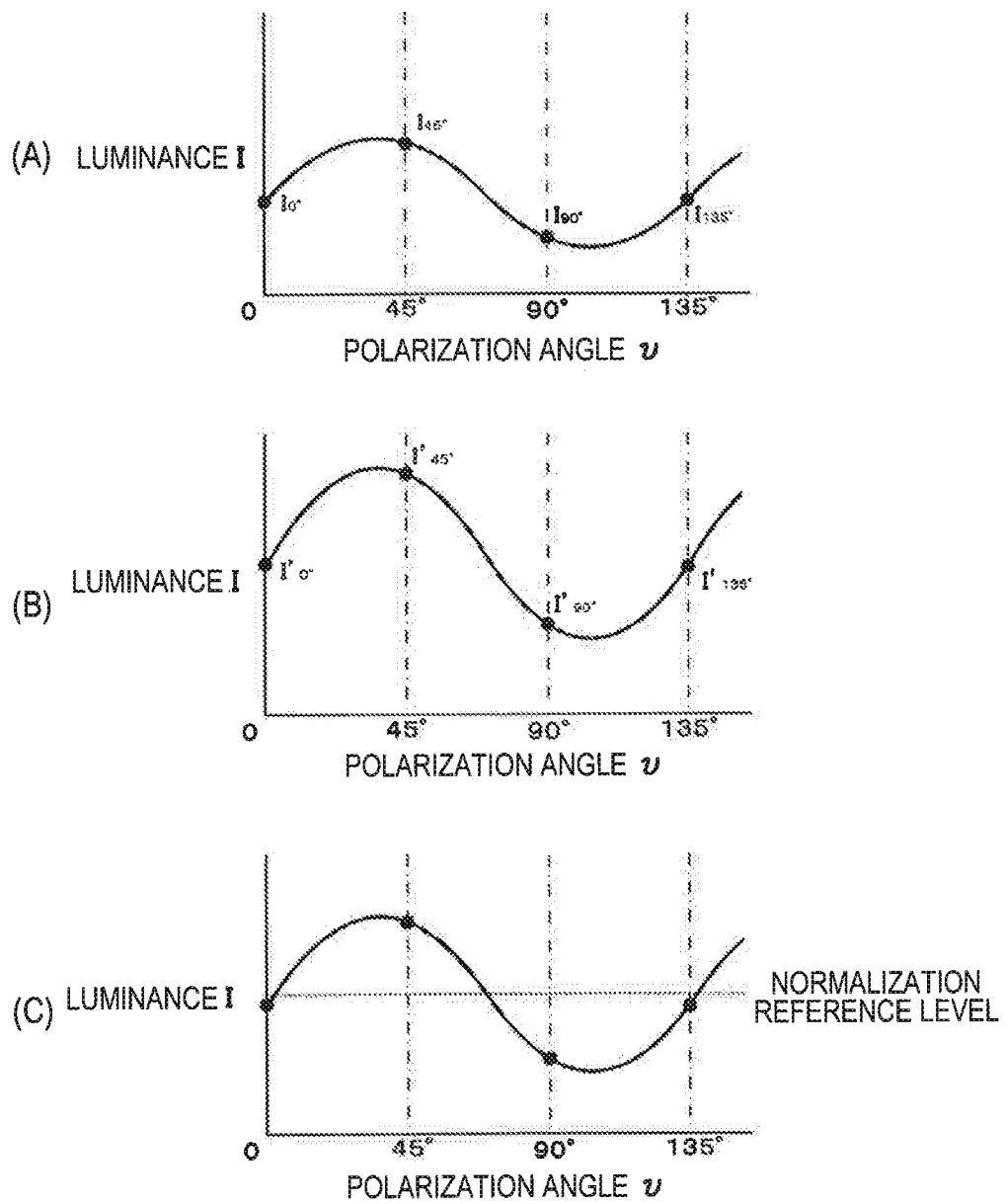
FIG. 3 is a diagram for describing computation of an image feature quantity.

The feature quantity computation unit 15 computes an image feature quantity on the basis of the polarization images acquired by the polarization image acquisition unit 11. The feature quantity computation unit 15 computes an image feature quantity according to a surface shape of the object in the polarization image, for example, for each pixel, on the basis of the polarization images. FIG. 3 is a diagram for describing computation of an image feature quantity. (A) and (B) of FIG. 3 illustrate a relation between an angle and luminance in the polarization direction in a feature quantity computation target pixel (hereinafter simply referred to as a "target pixel") of the image feature quantity in the polarization image. (B) of FIG. 3 illustrates the case in which illumination light is brighter than that of (A) of FIG. 3. Also, FIG. 3 illustrates the case in which the polarization image acquisition unit 11 acquires polarization images for which angles of the polarization directions (hereinafter referred to as "polarization angles") are 0 degrees, 45 degrees, 90 degrees, and 135 degrees. Also, the luminance is $I_{0°}$ and $I'_{0°}$ when the polarization angle in the target pixel is 0 degrees, the luminance is $I_{45°}$ and $I'_{45°}$ when the polarization angle is 45 degrees, the luminance is $I_{90°}$ and $I'_{90°}$ when the polarization angle is 90 degrees, and the luminance is $I_{135°}$ and $I'_{135°}$ when the polarization angle is 135 degrees. Thus, the luminance of the polarization image changes according to illumination or the like. Therefore, the feature quantity computation unit 15 normalizes the luminance so that the feature is the same even when the luminance is different. The feature quantity computation unit 15 computes a mean of luminances of polarization angles and computes the normalized luminance by dividing the luminance of each polarization angle by the computed mean luminance. Also, (C) of FIG. 3 illustrates the normalized luminance and a normalization reference level corresponds to the mean luminance.

The feature quantity computation unit 15 designates the normalized luminance of each polarization angle as an image feature quantity. Also, Formula (1) shows an example of an image feature quantity when a polarization image having a polarization angle of 0 degrees, 45 degrees, 90 degrees, or 135 degrees is acquired.

[Math. 1]

$$\frac{[I_{0°}, I_{45°}, I_{90°}, I_{135°}]}{\text{mean}(I_{0°}, I_{45°}, I_{90°}, I_{135°})} \quad (1)$$

The image feature quantity computed as described above is designated as information indicating a surface shape of the object position corresponding to the target pixel.

Figure 4:
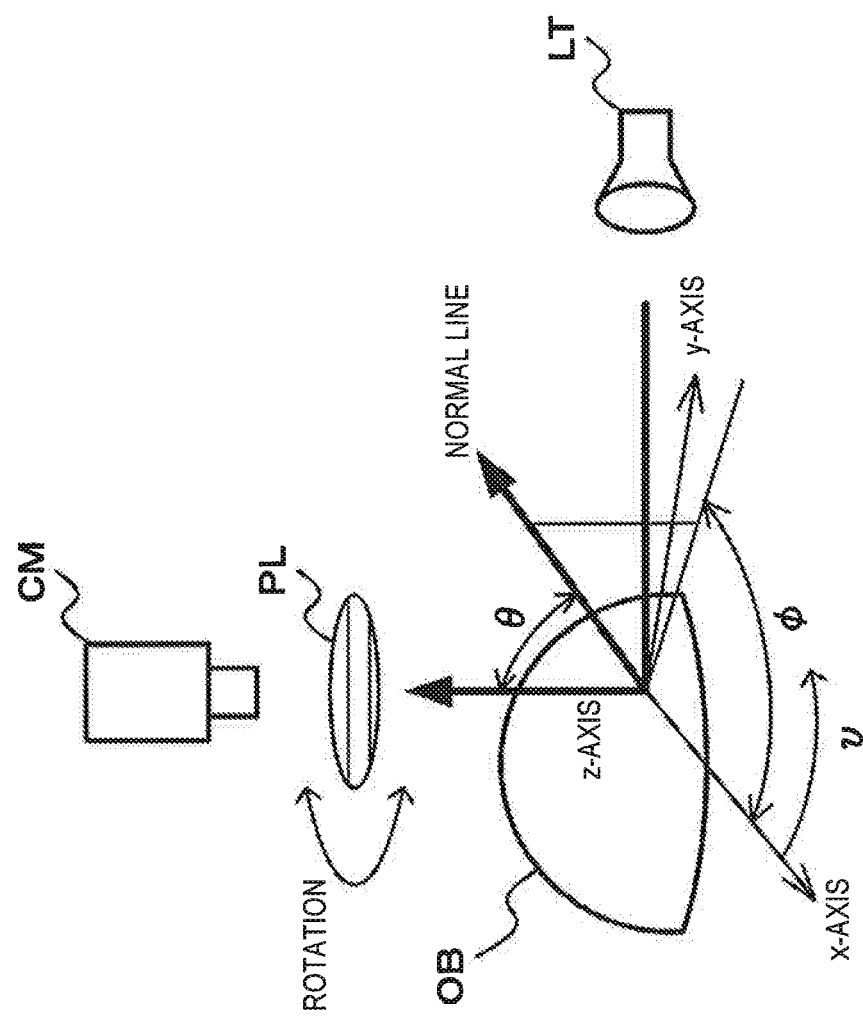
FIG. 4 is a diagram for describing an object surface shape and a polarization image.
Figure 5:
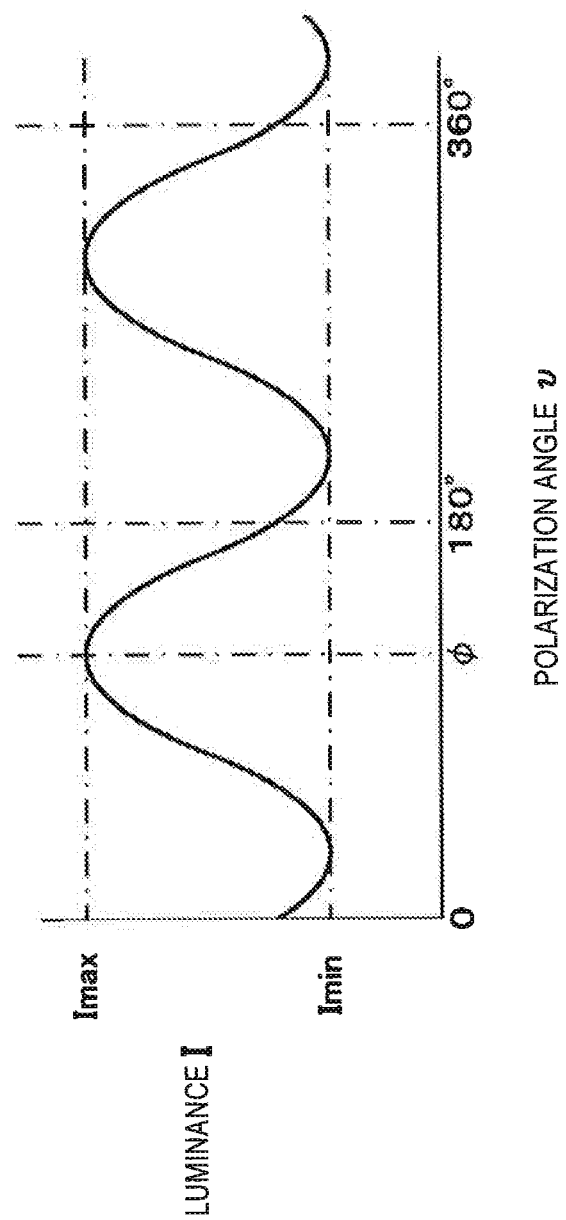
FIG. 5 is a diagram illustrating a relation between luminance and a polarization angle.

Here, the object surface shape and the polarization image will be described using FIG. 4. For example, as illustrated in FIG. 4, the illumination of an object OB is performed using a light source LT and an imaging unit CM images the object OB via the polarizing plate PL. In this case, the luminance of the object OB in a captured image changes according to rotation of the polarizing plate PL. Also, when the polarizing plate PL is rotated, the highest luminance is designated as Imax and the lowest luminance is designated as Imin. Also, when the x-axis and the y-axis in two-dimensional coordinates are set on the plane of the polarizing plate PL, an angle of the y-axis direction to the x-axis when the polarizing plate PL is rotated is designated as a polarization angle υ. The polarizing plate PL returns to the original polarization state when the polarizing plate PL is rotated by 180 degrees and has a cycle of 180 degrees. Also, the polarization angle υ when the maximum luminance Imax is observed is designated as an azimuth angle φ. When such definitions are performed, the luminance 1 observed when the polarizing plate PL is rotated can be represented as in Formula (2). Also, FIG. 5 illustrates a relation between luminance and a polarization angle. Also, this example shows a model of diffuse reflection and an azimuth angle is shifted by 90 degrees as compared with the polarization angle in the case of specular reflection.

[Math. 2]

$$I = \frac{I_{max} + I_{min}}{2} + \frac{I_{max} - I_{min}}{2}\cos(2\upsilon - 2\phi) \quad (2)$$

In Formula (2), the polarization angle υ becomes clear when the polarization image is generated and the maximum luminance Imax, the minimum luminance Imin, and the azimuth angle φ become variables. Therefore, it is possible to determine the azimuth angle φ which is a polarization angle at which the maximum luminance is provided on the basis of a function indicating a relation between the luminance and the polarization angle by performing fitting for the function shown in Formula (2) using the luminances of polarization images of three or more polarization directions.

Also, a physical object surface normal line is represented by a polar coordinate system and normal information is designated as the azimuth angle φ and a zenith angle θ. Also, the zenith angle θ is an angle toward the normal line from the z-axis and the azimuth angle φ is an angle of the y-axis direction to the x-axis as described above. Here, if the minimum luminance Imin and the maximum luminance Imax are obtained when the polarizing plate PL rotates, a degree of polarization ρ can be computed on the basis of Formula (3).

[Math. 3]

$$\rho = \frac{I_{max} - I_{min}}{I_{max} + I_{min}} \quad (3)$$

Figure 6:
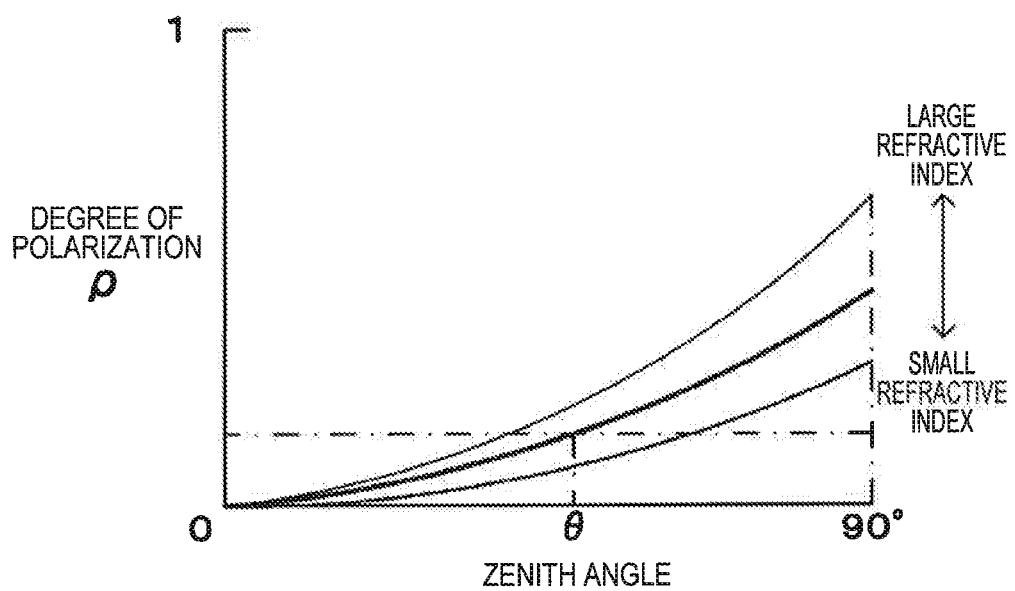
FIG. 6 is a diagram illustrating a relation between a degree of polarization and a zenith angle.

It can be seen that the relation between the degree of polarization ρ and the zenith angle θ has, for example, characteristics illustrated in FIG. 6, from Fresnel's formula in the case of the diffuse reflection. Therefore, it is possible to determine the zenith angle θ on the basis of the degree of polarization ρ from the characteristics illustrated in FIG. 6. Also, the characteristics illustrated in FIG. 6 are illustrative and the characteristics change depending upon a refractive index or the like of the object. For example, the degree of polarization increases as the refractive index increases.

As described above, the image feature quantity of the target pixel is information indicating a surface shape of the object position corresponding to the target pixel from the fact that the amplitude of the luminance has a characteristic of the zenith angle and a phase of a function indicating a relation between the luminance and the polarization angle has a characteristic of the azimuth angle.

The feature quantity computation unit 15 normalizes the luminances of the polarization images of the three or more polarization directions as described above and designates the normalized luminance in the polarization image of each polarization direction as the image feature quantity.

Also, in the computation of the image feature quantity, it is preferable that the polarization angle υ be in a range of "0 degrees≤υ<180 degrees" and all polarization images having the same difference between polarization angles be used. For example, polarization images having polarization angles υ of "0 degrees, 60 degrees, and 120 degrees" may be used or polarization images of polarization angles υ of "0 degrees, 30 degrees, 60 degrees, 90 degrees, 120 degrees, and 150 degrees," etc. may be used. Further, when polarization images having different differences between polarization angles are included, it is preferable to compute the image feature quantity by selectively employing the polarization image at the polarization angle υ which satisfies Formula (4). For example, when the polarization angles υ of the polarization images are "0 degrees, 60 degrees, 120 degrees, and 150 degrees," normalization is performed using the polarization images having the polarization angles υ of "0 degrees, 60 degrees, and 120 degrees." It is possible to perform the normalization with higher precision using polarization images having the same difference between the polarization angles as described above.

[Math. 4]

$$\Sigma\cos(2\upsilon - 2\phi) = 0 \quad (4)$$

Figure 7:
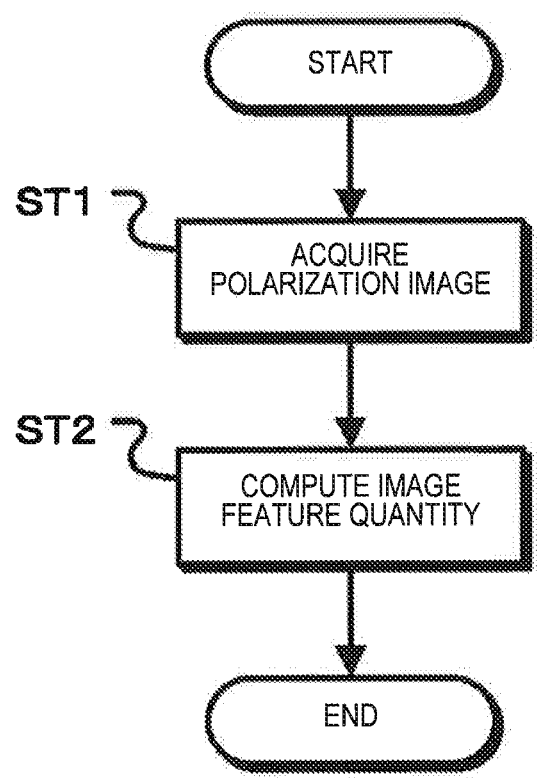
FIG. 7 is a flowchart illustrating an operation of an image feature quantity computation device.

FIG. 7 is a flowchart illustrating an operation of the image feature quantity computation device. In step ST1, the image feature quantity computation device 10 acquires polarization images. The image feature quantity computation device 10 generates the polarization images of three or more polarization directions and proceeds to step ST2.

In step ST2, the image feature quantity computation device 10 computes image feature quantities. The image feature quantity computation device 10 normalizes luminances of the polarization images of the three or more polarization directions. Further, the image feature quantity computation device 10 designates the normalized luminance of each polarization image as an image feature quantity to be used for each pixel.

As described above, the image feature quantity computation device acquires the polarization images of the three or more polarization directions and computes the image feature quantity on the basis of the acquired polarization images. From the fact that the polarization image has luminance changing according to the polarization direction and a surface shape of an object as described above, the image feature quantity according to the surface shape of the object can be computed by computing the image feature quantity on the basis of the polarization images. Further, from the fact that the image feature quantity is information related to a normal direction, but is not information indicating a computation result of the normal direction, it is not necessary to consider the uncertainty of 180 degrees. Also, from the fact that the image feature quantity is a feature quantity according to an object surface shape, the image feature quantity is not as easily affected by a light source as a feature quantity based on gradient information of single three-primary-color images or luminance images.

Also, the image feature quantity computation device can normalize the luminance of the polarization image and compute an image feature quantity robust to a difference of the luminance of the illumination light or the like using the normalized luminance. Further, from the fact that the normalized luminance is used, it is not necessary to perform a process of fitting or the like for a function shown in Formula (2) as in the generation of the normal information and the image feature quantity can be easily computed. Also, the image feature quantity can be computed even when the object has a flat shape.

[1-3. Other Operation of Image Feature Quantity Computation Device]

Next, for example, an operation of the case in which information of a space direction is used and an operation of the case in which a reflection component or a refractive index is clear will be described as other operations of the image feature quantity computation device.

Figure 8:
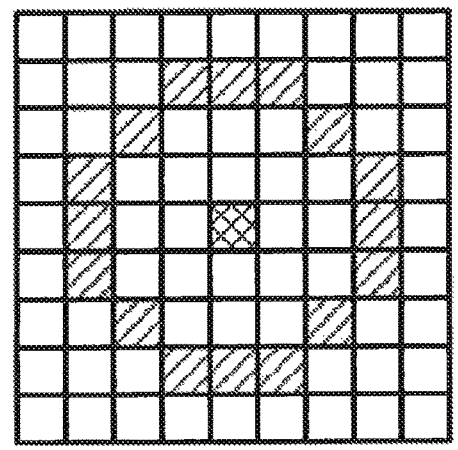
FIG. 8 is a diagram for describing an operation of a feature quantity computation unit when information of a space direction is used.

FIG. 8 is a diagram for describing an operation of a feature quantity computation unit when the information of the space direction is used. As described above, the feature quantity computation unit 15 computes an image feature quantity of each pixel position using the normalized luminance of the polarization image. Thereafter, the feature quantity computation unit 15 uses an image feature quantity of a pixel positioned near a target pixel to designate the used image feature quantity as an image feature quantity of a target pixel. Also, (A) of FIG. 8 illustrates the case in which image feature quantities of eight pixels adjacent to the target pixel are used and (B) of FIG. 8 illustrates the case in which image feature quantities of pixels indicated by diagonal lines at circumferential positions around the target pixel are used.

As illustrated in (A) of FIG. 8, the image feature quantity of the target pixel is a 36 (=9×4)-dimensional feature quantity as shown in Formula (5) when a target pixel is denoted by $P^5$ and adjacent pixels are denoted by $P^1$ to $P^4$ and $P^6$ to $P^9$.

[Math. 5]

$$\left.\begin{array}{c} \dfrac{[I_{0°}^1, I_{45°}^1, I_{90°}^1, I_{135°}^1]}{\text{mean}(I_{0°}^1, I_{45°}^1, I_{90°}^1, I_{135°}^1)} \\ \vdots \\ \dfrac{[I_{0°}^9, I_{45°}^9, I_{90°}^9, I_{135°}^9]}{\text{mean}(I_{0°}^9, I_{45°}^9, I_{90°}^9, I_{135°}^9)} \end{array}\right\} \quad (5)$$

As illustrated in (B) of FIG. 8, the image feature quantities of the pixels indicated by diagonal lines at circumferential positions around the target pixel are used when the target pixel is a pixel indicated by cross hatches. Here, from the fact that the number of peripheral pixels indicated by the diagonal lines is 16, the image feature quantity of the target pixel becomes a 64 (=16×4)-dimensional feature quantity when the number of polarization directions is 4. Also, the image feature quantity of the target pixel may be a 68 (=17×4)-dimensional feature quantity using the image feature quantities of the pixels indicated by the diagonal lines and the image feature quantity of the target pixel indicated by cross hatches.

Thus, if the image feature quantity of the pixel of the space direction is used on the basis of the target pixel, it is possible to compute the image feature quantity considering a shape of a periphery of the target pixel.

Next, the case in which the reflection component is clear will be described. The reflection component includes a diffuse reflection component and a specular reflection component and the azimuth angle has a phase difference of 90 degrees between the diffuse reflection and the specular reflection. Therefore, the feature quantity computation unit 15 computes the image feature quantity in consideration of the reflection component when the reflection component is clear.

The case in which the reflection component is clear includes the case in which a ratio between the diffuse reflection component and the specular reflection component is unclear but it is clear which of the components is dominant and the case in which the ratio between the diffuse reflection component and the specular reflection component is clear.

When the ratio between the diffuse reflection component and the specular reflection component is unclear but it is clear which of the components is dominant, the feature quantity computation unit 15 designates an image feature quantity in which a phase difference of 90 degrees occurs in a region in which the diffuse reflection component is dominant and a region in which the specular reflection component is dominant in the polarization image as the image feature quantity. For example, the polarization image acquisition unit 11 acquires polarization images of four directions in which polarization angles are 0 degrees, 45 degrees, 90 degrees, and 135 degrees. In this case, the feature quantity computation unit 15 uses the image feature quantity shown in Formula (6) in the region in which the diffuse reflection component is dominant and uses the image feature quantity shown in Formula (7) in which the phase difference of 90 degrees occurs in the region in which the specular reflection component is dominant.

[Math. 6]

$$\dfrac{[I_{0°}, I_{45°}, I_{90°}, I_{135°}]}{\text{mean}(I_{0°}, I_{45°}, I_{90°}, I_{135°})} \quad (6)$$

$$\dfrac{[I_{90°}, I_{135°}, I_{0°}, I_{45°}]}{\text{mean}(I_{0°}, I_{45°}, I_{90°}, I_{135°})} \quad (7)$$

When the ratio between the diffuse reflection component and the specular reflection component is clear, the feature quantity computation unit 15 computes the image feature quantity considering the ratio. The feature quantity computation unit obtains the image feature quantity of the component of diffuse reflection light by multiplying the luminance of the polarization image by d (or "d/(d+s)"), for example, when the ratio between the diffuse reflection component and the specular reflection component is "d:s." Also, the feature quantity computation unit 15 obtains the image feature quantity of the component of specular reflection light by multiplying the luminance of the polarization image by s (or "s/(d+s)"). Further, the feature quantity computation unit 15 designates an 8-dimensional feature quantity shown in Formula (8) as the image feature quantity using a feature quantity of each component.

Thus, the feature quantity computation unit 15 can compute the image feature quantity according to a difference between reflection components of the object because the image feature quantity can be computed in consideration of the reflection components.

[Math. 7]

$$\left.\begin{array}{c} \dfrac{[I_{0°}^d, I_{45°}^d, I_{90°}^d, I_{135°}^d]}{\text{mean}(I_{0°}^d, I_{45°}^d, I_{90°}^d, I_{135°}^d)} \\ \dfrac{[I_{0°}^s, I_{45°}^s, I_{90°}^s, I_{135°}^s]}{\text{mean}(I_{0°}^s, I_{45°}^s, I_{90°}^s, I_{135°}^s)} \end{array}\right\} \quad (8)$$

Figure 9:
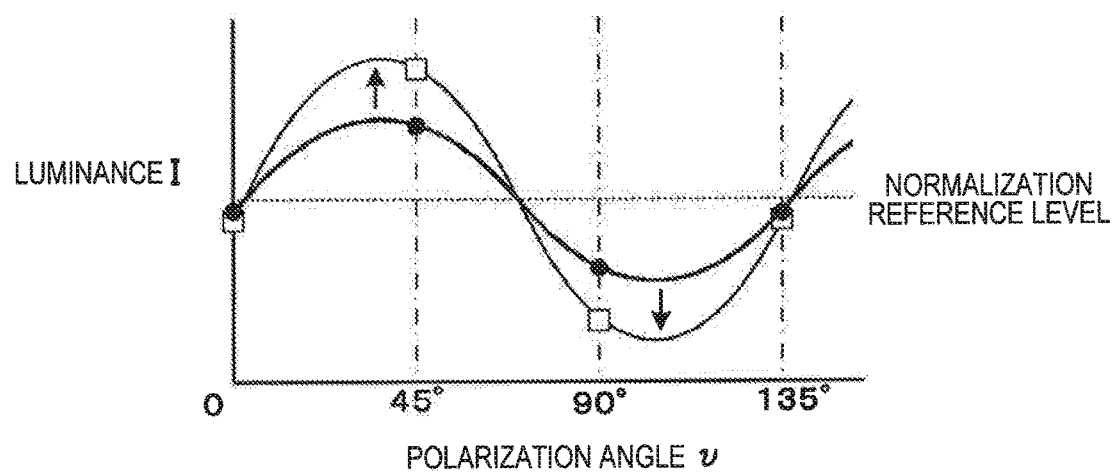
FIG. 9 is a diagram illustrating the case in which an image feature quantity is computed according to a refractive index.

Next, the case in which the refractive index of the object is clear will be described. In terms of a relation between the degree of polarization ρ and the zenith angle θ, for example, when the zenith angle is the same as illustrated in FIG. 6 described above, the degree of polarization decreases as the refractive index decreases. Also, when the normalization reference level (mean luminance) is uniform, the denominator of Formula (3) used in the computation of the degree of polarization ρ is uniform. Therefore, as the refractive index decreases, the amplitude of the luminance change (corresponding to the numerator of Formula (3)) decreases. Therefore, when the refractive index is clear, the image feature quantity is computed according to the refractive index. FIG. 9 illustrates the case in which the image feature quantity is computed according to the refractive index. The feature quantity computation unit 15 sets the luminance of each polarization image to a value multiplied by (1/Refractive Index Ratio), for example, based on the normalized luminance level. Also, the refractive index ratio indicates a ratio of a refractive index of the object to a preset predetermined refractive index and the amplitude increases when the refractive index of the object is less than the predetermined refractive index. Therefore, as illustrated in FIG. 9, the luminance is adjusted from a level of the black circle to a level of the square and the adjusted luminance is used as the image feature quantity. Also, FIG. 9 illustrates the case in which the polarization angles of the polarization images are 0 degrees, 45 degrees, 90 degrees, and 135 degrees.

The image feature quantity computation device 10 can compute the image feature quantity according to a difference in the refractive index of the object by computing the image feature quantity on the basis of the refractive index as described above. For example, even when the surface shape of the object is the same, it is possible to compute an image feature quantity of a different value when the material of the object is different and the refractive index is different.

<2. Other Configuration and Operation of Image Feature Quantity Computation Device>

The computation of the image feature quantity is not limited to the case in which the image feature quantity is computed from the polarization image, but a feature quantity computed in another feature quantity computation technique may also be used. Next, the configuration and operation of the image feature quantity computation device when the feature quantity computed in the other feature quantity computation technique, for example, the feature quantity computed from a non-polarization image, is used will be described.

[2-1. Other Configuration of Image Feature Quantity Computation Device]

Figure 10:
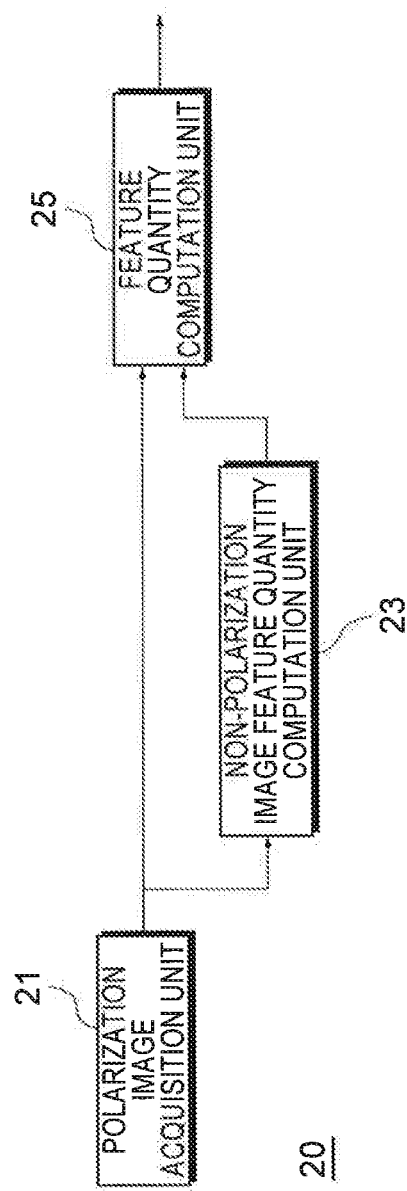
FIG. 10 is a diagram illustrating another configuration of the image feature quantity computation device.

FIG. 10 illustrates the other configuration of the image feature quantity computation device. The image feature quantity computation device 20 includes a polarization image acquisition unit 21, a non-polarization image feature quantity computation unit 23, and a feature quantity computation unit 25.

The polarization image acquisition unit 21 acquires polarization images of three or more polarization directions. The polarization image acquisition unit 21, for example, may be a component having an imaging unit configured to generate the polarization images of the three or more polarization directions or a component configured to acquire the polarization images of the three or more polarization directions from an external device, a recording medium, or the like.

The non-polarization image feature quantity computation unit 23 generates a non-polarization image from the polarization images acquired by the polarization image acquisition unit 21 and computes a feature quantity on the basis of the non-polarization image.

The feature quantity computation unit 25 computes the image feature quantity using the polarization images acquired by the polarization image acquisition unit 21 and the feature quantity computed by the non-polarization image feature quantity computation unit 23.

[2-2. Operation of Other Configuration of Image Feature Quantity Computation Device]

The non-polarization image feature quantity computation unit 23 generates a non-polarization luminance image from polarization images of three or more polarization directions. For example, the non-polarization image feature quantity computation unit 23 generates the non-polarization luminance image by averaging luminances of the polarization images of the three or more polarization directions for each pixel. Next, the non-polarization image feature quantity computation unit 23 performs a process of computing the feature quantity, for example, based on gradient information of the luminance, using the generated luminance image. The non-polarization image feature quantity computation unit 23 performs a feature quantity computation process such as a scale-invariant feature transform (SIFT), speeded-up robust features (SURF), features from accelerated segment test (FAST), Hessian, or Harris which is a feature quantity computation technique based on the gradient information or computes a feature quantity of a binary code. The non-polarization image feature quantity computation unit 23 outputs information obtained in the feature quantity computation process or the computed feature quantity to the feature quantity computation unit 25.

The feature quantity computation unit 25 computes an image feature quantity using the polarization image and information or a feature quantity provided from the non-polarization image feature quantity computation unit 23.

FIG. 11 is a diagram for describing an operation of the feature quantity computation unit when the non-polarization image feature quantity computation unit computes an SIFT feature quantity. As illustrated in (A) of FIG. 11, the non-polarization image feature quantity computation unit 23 computes a feature quantity by performing normalization (normalization of a direction) on a description region ARk which is a peripheral region of a keypoint KP in a direction of an orientation Rk for the keypoint KP detected from the non-polarization image. Therefore, the non-polarization image feature quantity computation unit 23 can compute an SIFT feature quantity robust to the rotation. Also, the direction of the orientation Rk is a direction determined on the basis of the gradient strength computed from a smoothed image from which the keypoint P is detected and a gradient direction histogram obtained by generating a histogram of the gradient direction. The feature quantity computation unit 25 acquires information based on the gradient strength and the gradient direction, that is, information indicating the direction of the orientation Rk, from the non-polarization image feature quantity computation unit 23 and creates the luminance of an angle corresponding to the direction of the orientation through interpolation or the like as illustrated in (B) of FIG. 11. For example, when the direction of the orientation is Hkp, the luminance $I_1$ of "Hkp," the luminance $I_2$ of "Hkp+45 degrees," the luminance $I_3$ of "Hkp+90 degrees," and the luminance $I_4$ of "Hkp+135 degrees" are computed and designated as image feature quantities for which the direction is normalized. Thus, the feature quantity computation unit 25 can compute an image feature quantity robust to the rotation using the information indicating the direction of the orientation Rk.

Also, the feature quantity computation unit 25 may increase the dimension of the image feature quantity using the SIFT feature quantity. For example, the feature quantity computation unit 25 divides the description region ARk into a plurality of blocks, computes the gradient strength for each of a plurality of predetermined directions in each block of the description region ARk normalized in the direction of the orientation Rk, and adds the gradient strength to the image feature quantity.

Figure 12:
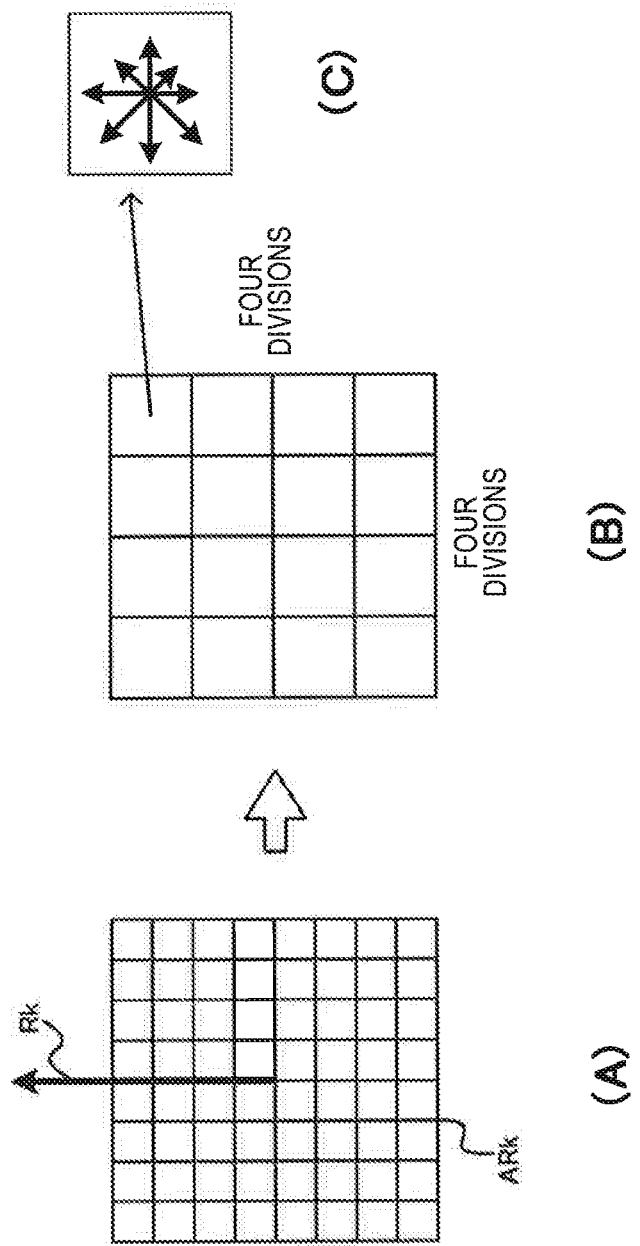
FIG. 12 is a diagram for describing the case in which the SIFT feature quantity is included in an image feature quantity.

FIG. 12 is a diagram for describing the case in which the SIFT feature quantity is included in the image feature quantity. The feature quantity computation unit 25 normalizes the description region ARk in the direction of the orientation Rk as illustrated in (A) of FIG. 12 and divides, for example, the description region ARk into 4 blocks×4 blocks, as illustrated in (B) of FIG. 12. Also, the feature quantity computation unit 25 obtains feature vectors of eight directions as illustrated in (C) of FIG. 12 for each block after dividing the description region ARk normalized in the direction of the orientation Rk and designates the feature vectors as gradient strengths of eight directions (eight dimensions). When this process is performed, "4 blocks×4 blocks×9 dimensions=128 dimensions" and the feature quantity computation unit 25 can compute a 128-dimensional feature quantity. Also, when this feature quantity is added to an image feature quantity (4 dimensions) computed by normalizing the luminance for each polarization image, "4 blocks×4 blocks×(8 dimensions+4 dimensions)=192 dimensions" and the feature quantity computation unit 25 can compute a 192-dimensional image feature quantity. Also, normalization according to the luminance of the polarization image may be configured to be performed either before or after the normalization according to the direction of the orientation.

FIG. 13 is a diagram for describing an operation of the feature quantity computation unit when the non-polarization image feature quantity computation unit computes an SURF feature quantity. As illustrated in (A) of FIG. 13, the non-polarization image feature quantity computation unit 23 computes a feature quantity by performing normalization (normalization of a direction) on a description region ARk which is a peripheral region of a keypoint KP in a direction of an orientation Rk for the keypoint KP detected from the non-polarization image. Therefore, the non-polarization image feature quantity computation unit 23 can compute an SURF feature quantity robust to the rotation. The feature quantity computation unit 25 acquires information based on the gradient strength and the gradient direction, that is, information indicating the direction of the orientation Rk, from the non-polarization image feature quantity computation unit 23 and creates the luminance of an angle corresponding to the direction of the orientation through interpolation or the like as illustrated in (B) of FIG. 13. For example, when the direction of the orientation is Hkp, the luminance $I_1$ of "Hkp," the luminance $I_2$ of "Hkp+45 degrees," the luminance $I_3$ of "Hkp+90 degrees," and the luminance $I_4$ of "Hkp+135 degrees" are computed and designated as image feature quantities for which the direction is normalized. Thus, the feature quantity computation unit 25 can compute an image feature quantity robust to the rotation using the information indicating the direction of the orientation Rk.

Also, the feature quantity computation unit 25 may increase the dimension of the image feature quantity using the SURF feature quantity. For example, the feature quantity computation unit 25 divides the description region ARk which is a peripheral region of the keypoint into a plurality of blocks, computes a Haar-Wavelet response for each block, and adds a feature quantity computed from a response value to the image feature quantity.

Figure 14:
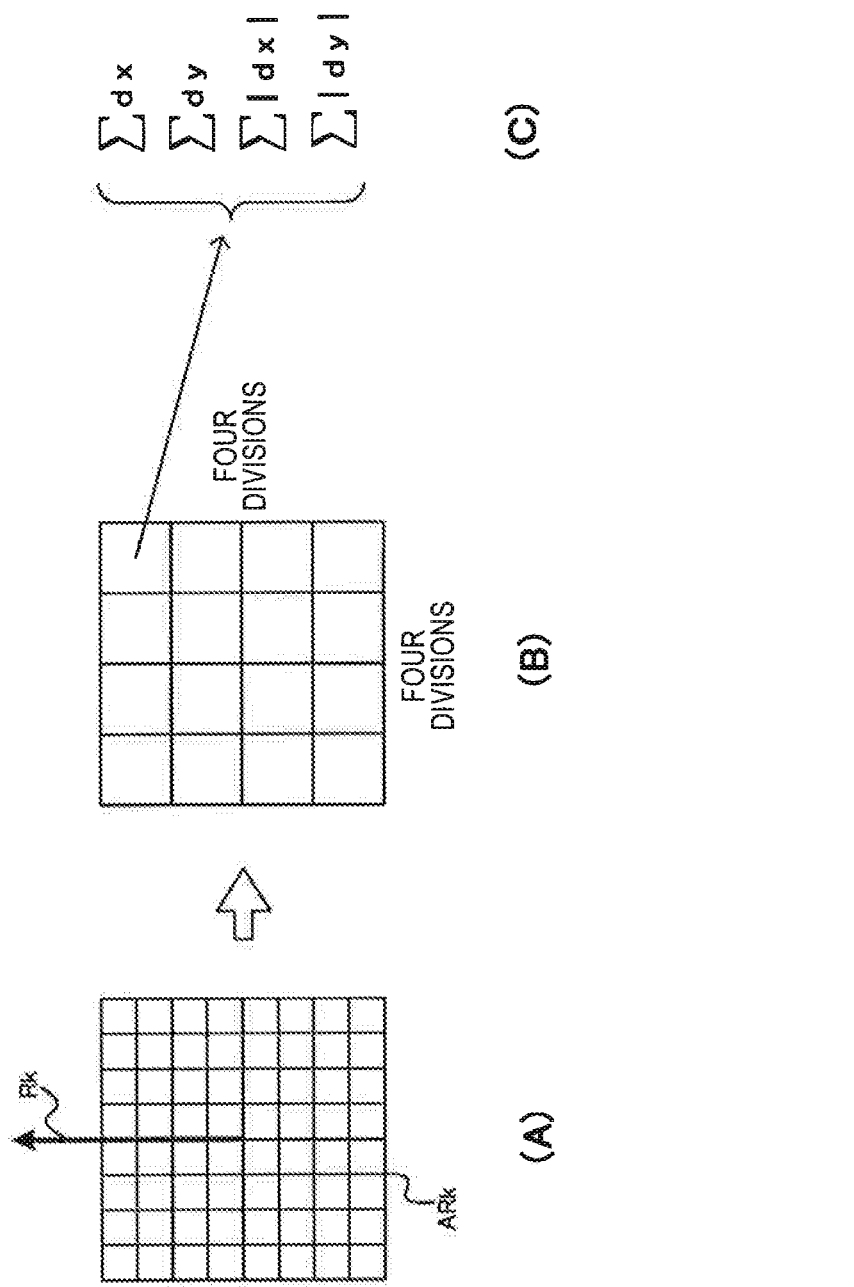
FIG. 14 is a diagram for describing the case in which the SURF feature quantity is included in an image feature quantity.

FIG. 14 is a diagram for describing the case in which the SURF feature quantity is included in an image feature quantity. The feature quantity computation unit 25 normalizes the description region ARk in the direction of the orientation Rk as illustrated in (A) of FIG. 14 and divides, for example, the description region ARk into 4 blocks×4 blocks, as illustrated in (B) of FIG. 14. Also, the feature quantity computation unit 25 computes the Haar-Wavelet response of each of 5×5 points sampled from the block for each division block. Further, the feature quantity computation unit 25 computes a 4-dimensional feature quantity illustrated in (C) of FIG. 14 from the computed response value. By performing this process, it is possible to obtain a feature quantity in "4 blocks×4 blocks×4 dimensions=64 dimensions. When this feature quantity is added to the 4-dimensional image feature quantity, "4 blocks×4 blocks×9 dimensions=128 dimensions" and the feature quantity computation unit 25 can compute a 128-dimensional feature quantity. Also, normalization according to the luminance of the polarization image may be configured to be performed either before or after the normalization according to the direction of the orientation.

Figure 15:
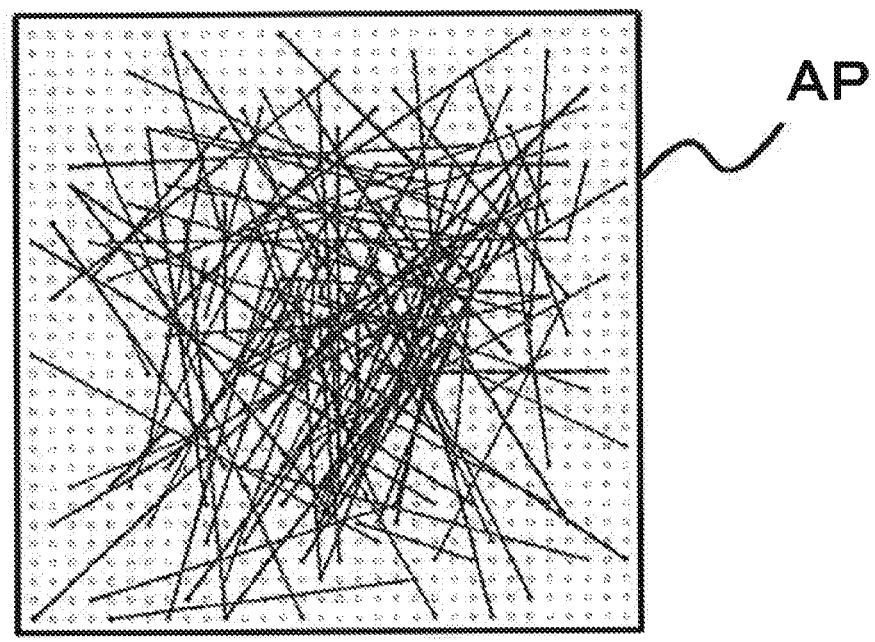
FIG. 15 is a diagram for describing an operation of the feature quantity computation unit when the non-polarization image feature quantity computation unit computes a binary feature quantity.

FIG. 15 is a diagram for describing an operation of the feature quantity computation unit when the non-polarization image feature quantity computation unit computes a binary feature quantity. In a process of computing a binary feature quantity, for example, binary robust independent elementary features (BRIEF), a binary sequence is generated by comparing pixel values of two points randomly selected within a patch. Here, a binary test τ of the patch AP indicates a binary value shown in Formula (9) according to a comparison result of pixel values of two points (a pair of point x and point y) within the patch AP. Also, a space arrangement of the binary test within the patch AP is indicated by a line segment in FIG. 15. Therefore, it is possible to obtain a 128-bit feature quantity if a process for 128 pairs is performed and obtain a 256-bit feature quantity if a process for 256 pairs is performed with respect to a non-polarization luminance image.

[Math. 8]

$$\tau(p; x, y) := \begin{cases} 1 & \text{if } I(p, x) < I(p, y) \\ 0 & \text{otherwise} \end{cases} \qquad (9)$$

The feature quantity computation unit 25 sets a patch based on a pixel of a computation target of the binary feature quantity, for example, for each of image feature quantities of four dimensions and performs a comparison as in Formula (9) for pairs of image feature quantities randomly selected within the patch. Here, for a feature quantity of each dimension, a (128×4)-bit image feature quantity can be computed when 128 pairs are set within the patch and a (256×4)-bit image feature quantity can be computed when 256 pairs are set.

Also, a process of computing the binary feature quantity may be configured to use another method. For example, it is possible to compute an image feature quantity having scale invariance and rotational invariance using binary robust invariant scalable keypoints (BRISK).

Thus, it is possible to further compute a high-dimensional image feature quantity if the feature quantity is computed using a feature quantity computation technique based on gradient information. Also, if the feature quantity is computed using SIFT, SURF, or the like, the image feature quantity robust to the rotation can be computed.

Figure 16:
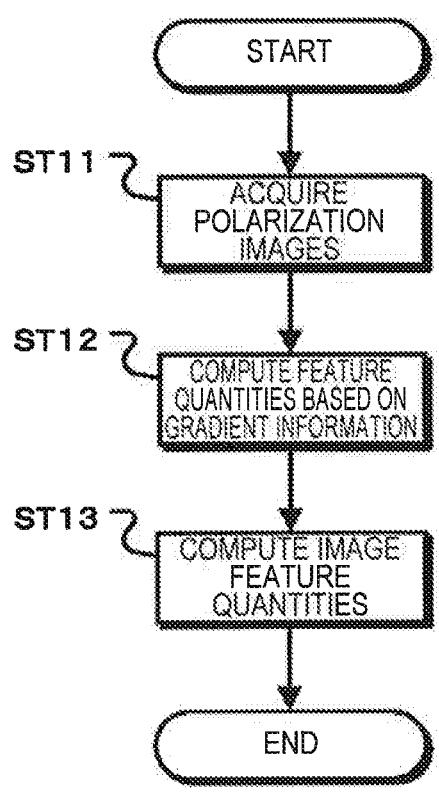
FIG. 16 is a flowchart illustrating an operation of another configuration of the image feature quantity computation device.

FIG. 16 is a flowchart illustrating the operation of the other configuration of the image feature quantity computation device. In step ST11, the image feature quantity computation device 20 acquires polarization images. The image feature quantity computation device 20 generates the polarization images of three or more polarization directions and proceeds to step ST12.

In step ST12, the image feature quantity computation device 20 computes feature quantities based on the gradient information. The image feature quantity computation device 20 generates a non-polarization luminance image from the polarization images of the three or more polarization directions. The image feature quantity computation device 20 computes a feature quantity based on the gradient information, for example, an SIFT feature quantity or an SURF feature quantity, a feature quantity of a binary code, or the like, on the basis of the generated non-polarization luminance image and proceeds to step ST13.

In step ST13, the image feature quantity computation device 20 computes image feature quantities. The image feature quantity computation device 20 normalizes the luminances of the polarization images of the three or more polarization directions and designates the normalized luminances as the image feature quantities. The image feature quantity computation device 20 may include the feature quantity computed in step ST12 in the image feature quantity. Also, the image feature quantity computation device 20 may perform normalization of a rotation direction or the like on the basis of the information obtained in the feature quantity computation in step ST12 and compute an image feature quantity robust to the difference of luminance or the rotation.

Thus, in the other configuration of the image feature quantity computation device, it is possible to compute the image feature quantity robust to the rotation from the fact that the image feature quantity is computed using the gradient strength determined when the feature quantity is computed on the basis of the gradient information of the non-polarization image and information based on the gradient direction. Also, a high-dimensional image feature quantity can be generated by including the feature quantity computed on the basis of the gradient information of the non-polarization image in the image feature quantity computed on the basis of the polarization image. Further, the image feature quantity serves as information indicating the shape of the surface of the object and a feature of the luminance of the object by including the feature quantity based on the gradient information in the image feature quantity based on the polarization image. Therefore, for example, even when one of the shape of the surface of the object and the luminance of the object is similar, an image feature quantity of a different value can be generated if the other is different.

Further, from the fact that feature quantities of SIFT, SURF, FAST, Hessian, Harris, etc. are computed, the non-polarization image feature quantity computation unit 23 may perform feature point detection on the basis of the feature quantity and compute the image feature quantity using the polarization image only for a region including the detected feature point.

Figure 17:
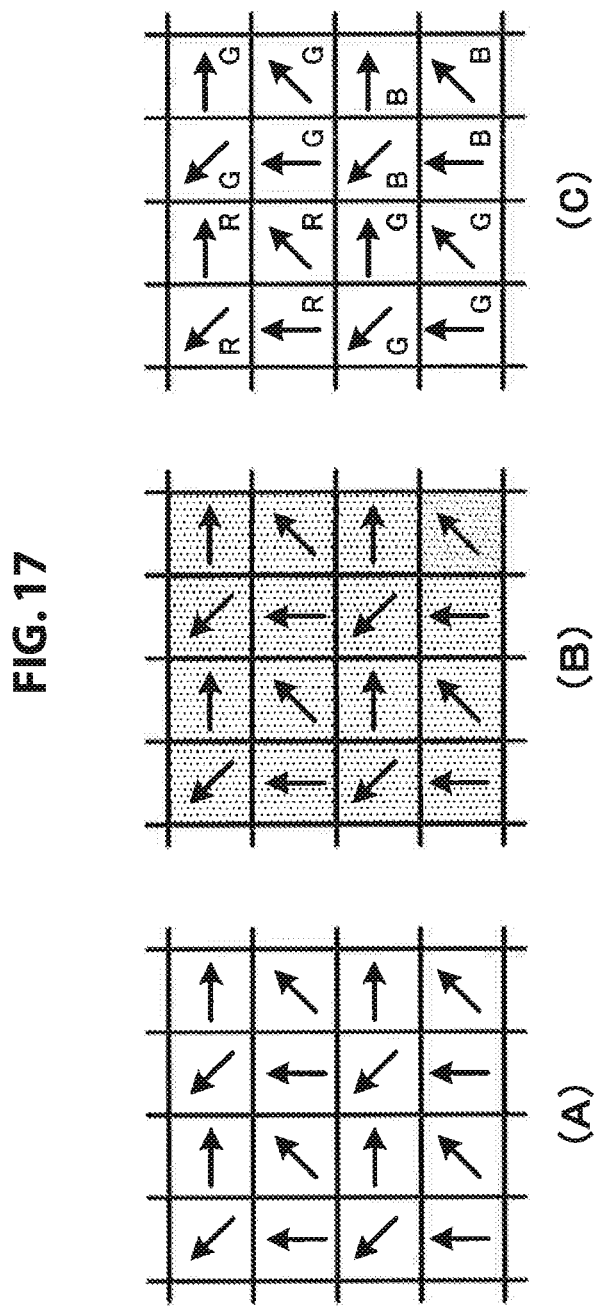
FIG. 17 is a diagram illustrating another example of a polarization image.

Also, for the polarization images acquired by the polarization image acquisition units 11 and 21, the polarization image of a white pixel may be acquired as illustrated in (A) of FIG. 17 or a polarization image of an infrared image may be acquired as illustrated in (B) of FIG. 17 using a color filter. Further, as illustrated in (C) of FIG. 17, a polarization image of three primary colors R, G, and B may be acquired. According to this, the three-primary-color image or the infrared image as well as the polarization image can be simultaneously acquired. Further, from the fact that the luminance image and the three-primary-color image or the infrared image can be simultaneously acquired in the image feature quantity computation devices 10 and 20, the feature quantity computation units 15 and 25 can also increase a dimension by including information such as a luminance value and a three-primary-color pixel value/infrared pixel value in the image feature quantity.

<3. Configuration and Operation of Image Processing Device>

Next, the image processing device for performing various processes using an image feature quantity computed by the image feature quantity computation device will be described. The image processing device performs various processes, for example, a recognition process, a feature point detection process, a matching process, etc., using the image feature quantity computed by the image feature quantity computation device. Next, the processes will be described.

[3-1. Recognition Process]

Figure 18:
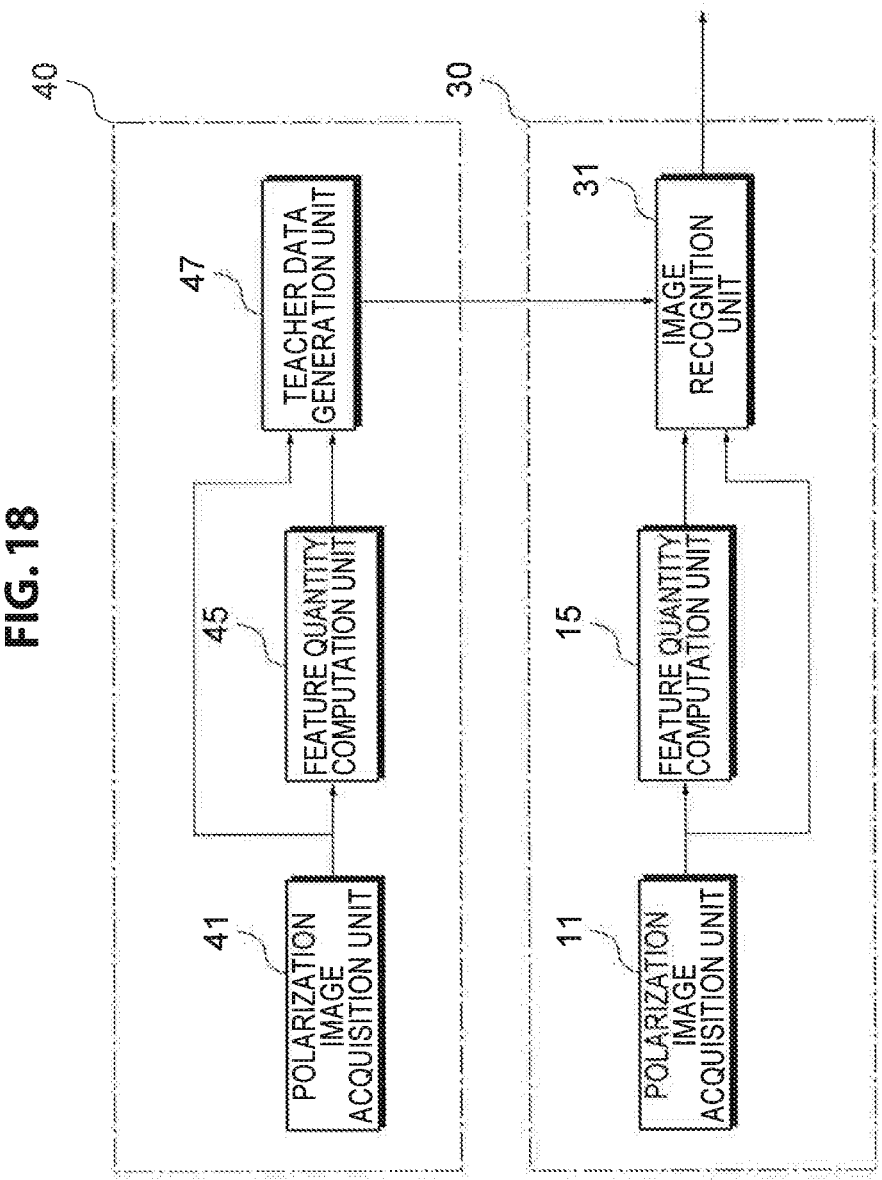
FIG. 18 is a diagram illustrating a configuration in which the image processing device performs a recognition process.

FIG. 18 is a diagram illustrating a configuration in which the image processing device performs the recognition process. The image processing device 30 has the polarization image acquisition unit 11, the feature quantity computation unit 15, and an image processing unit configured to perform image processing using the image feature quantity, for example, an image recognition unit 31 configured to perform the recognition process.

As described above, the polarization image acquisition unit 11 acquires polarization images of three or more polarization directions and outputs the polarization images to the feature quantity computation unit 15 and the image recognition unit 31. Also, the feature quantity computation unit 15 computes an image feature quantity on the basis of the polarization images acquired by the polarization image acquisition unit 11.

The image recognition unit 31 divides a region on the basis of the polarization images provided from the polarization image acquisition unit 11. The image recognition unit 31 generates, for example, an image equivalent to a non-polarization normal luminance image by averaging luminances of the polarization images of the three or more polarization directions. The image recognition unit 31 performs texture analysis, contour extraction, etc. using the generated non-polarization luminance image and divides the image acquired by the polarization image acquisition unit 11 into object-specific regions. Also, when the polarization image provided from the polarization image acquisition unit 11 is a color image, the image recognition unit 31 performs color analysis, etc. and divides the image acquired by the polarization image acquisition unit 11 into object-specific regions on the basis of the analysis result. The image recognition unit 31 designates the divided region as the recognition target region and performs object recognition for a recognition target region using the image feature quantity within the recognition target region and teacher data pre-generated by a learning device 40. For example, the image recognition unit 31 determines an object corresponding to the teacher data most similar to the image feature quantity within the recognition target region as an object of the recognition target region.

The learning device 40 has a polarization image acquisition unit 41, a feature quantity computation unit 45, and a teacher data generation unit 47 configured to generate teacher data using the image feature quantity.

The polarization image acquisition unit 41 acquires teacher polarization images of three or more polarization directions obtained by imaging a learning object, for example, a face, a car, an airplane, or the like. The polarization image acquisition unit 41 may be, for example, a component having an imaging unit configured to generate teacher polarization images of three or more polarization directions or a component configured to acquire the teacher polarization images of the three or more polarization directions from an external device, a recording medium, or the like. The polarization image acquisition unit 41 outputs the acquired teacher polarization images to the feature quantity computation unit 45 and the teacher data generation unit 47.

The feature quantity computation unit 45 computes an image feature quantity on the basis of the teacher polarization image acquired by the polarization image acquisition unit 41.

As in the image recognition unit 31, the teacher data generation unit 47 divides a region on the basis of the polarization image provided from the polarization image acquisition unit 41. The teacher data generation unit 47 generates, for example, an image equivalent to a non-polarization normal luminance image by averaging luminances of teacher polarization images of different polarization directions. The teacher data generation unit 47 performs texture analysis, contour extraction, or the like using the generated non-polarization luminance image and divides the teacher polarization image acquired by the polarization image acquisition unit 41 into object-specific regions. Also, when the teacher polarization image provided from the polarization image acquisition unit 41 is a color image, the teacher data generation unit 47 performs color analysis, etc. and divides the teacher polarization image acquired by the polarization image acquisition unit 41 into object-specific regions on the basis of an analysis result. The teacher data generation unit 47 designates the image feature quantity within the object region after the division as teacher data of the object corresponding to the object region. The learning device 40 may pre-perform this process for each object and generate teacher data for each object. Further, when the recognition process is performed, the learning device 40 outputs the pre-generated teacher data to the image recognition unit 31. Therefore, if teacher data of various objects is pre-generated and teacher data corresponding to an image feature quantity of a recognition target region is clear, an object for which an image of the recognition target region is captured is recognizable.

Also, in the recognition process, a plurality of polarization images as well as the image feature quantity may be used. For example, it is possible to obtain an image similar to the non-polarization luminance image or the three-primary-color image when pixel values for each same pixel position are added and averaged using a plurality of polarization images. Therefore, the recognition process can be precisely performed by performing the recognition process using the image feature quantity and the non-polarization image generated from the plurality of polarization images.

Figure 19:
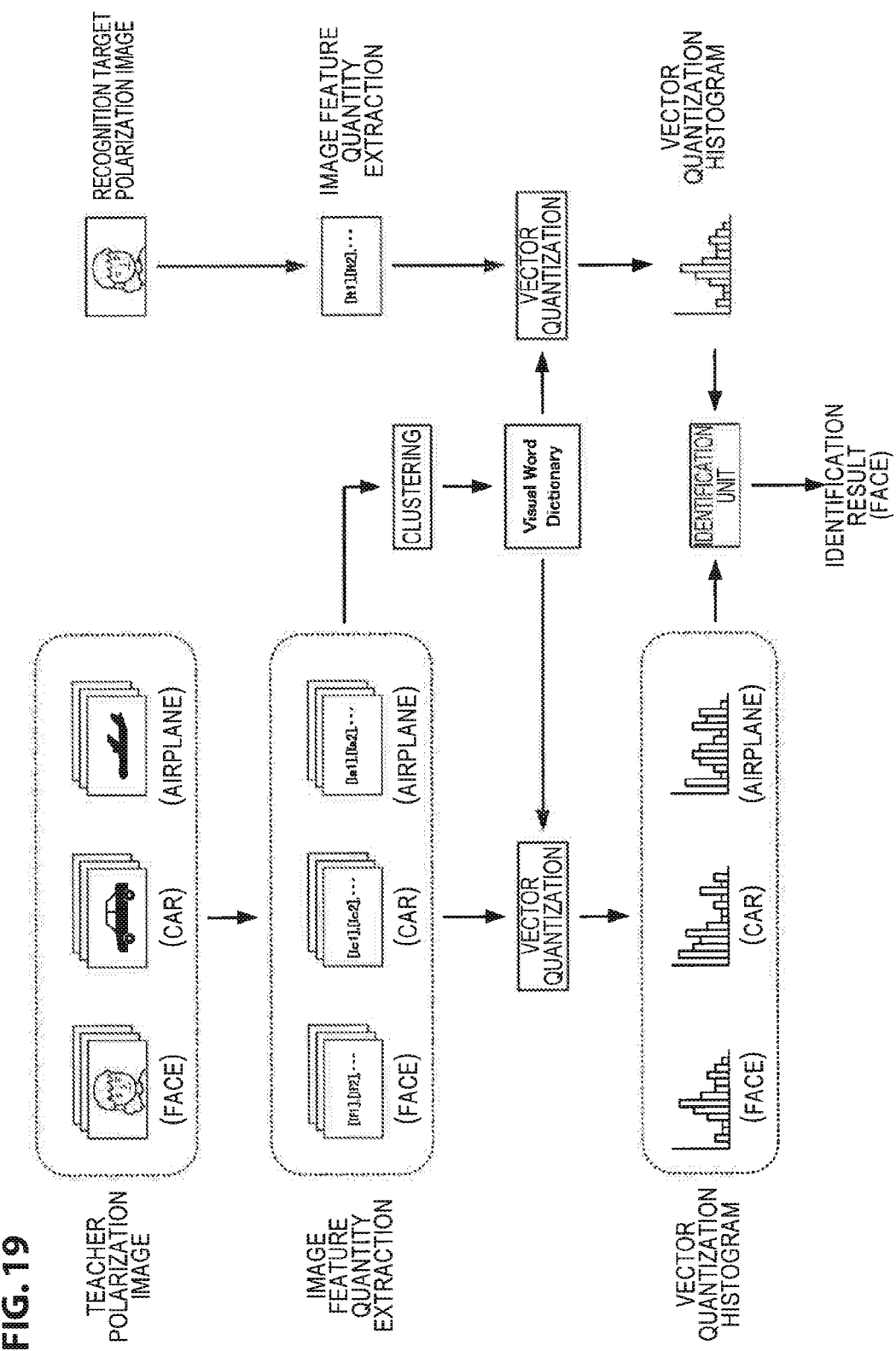
FIG. 19 is a diagram for describing the operation of the image processing device.

FIG. 19 is a diagram for describing the operation of the image processing device. Also, FIG. 19 illustrates, for example, the case in which recognition by bag-of-features is performed. In the bag-of-features, the learning device 40 computes the image feature quantity from the teacher polarization image and performs vector quantization on the computed image feature quantity. A code book used in the vector quantization is referred to as a "visual word dictionary," and is pre-created from the teacher polarization image. Also, the learning device 40 creates a vector quantization histogram using the image feature quantity on which the vector quantization is performed. The obtained vector quantization histogram is designated as teacher data. The image processing device 30 acquires a recognition target polarization image including an object of a recognition target, computes an image feature quantity from the recognition target polarization image, and performs the vector quantization on the image feature quantity using the pre-created codebook. Also, the image processing device 30 creates a vector quantization histogram indicating a frequency of each "visual word" of the image feature quantity on which the vector quantization is performed. The image processing device 30 identifies the teacher data most similar to the obtained vector quantization histogram (a vector quantization histogram of the teacher polarization image) and designates the object corresponding to the identified teacher data as the object of the recognition target polarization image. Thus, in the recognition by the bag-of-features, the object is recognized using the vector quantization histogram created on the basis of the image feature quantity.

Figure 20:
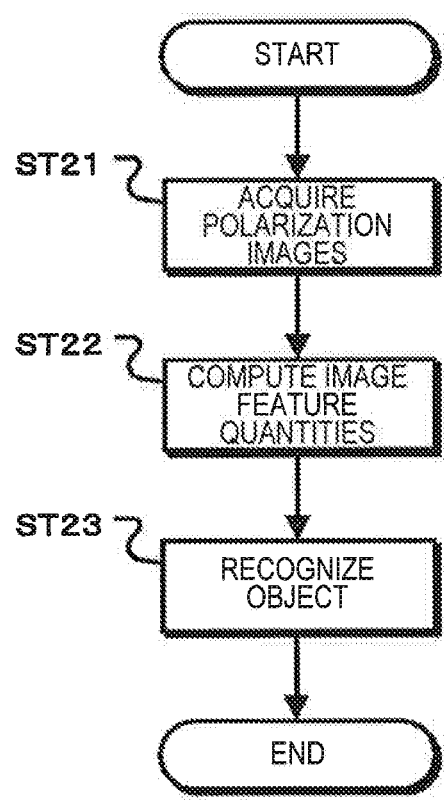
FIG. 20 is a flowchart illustrating an operation of the recognition process.

FIG. 20 is a flowchart illustrating an operation of the recognition process. In step ST21, the image processing device 30 acquires polarization images. The image processing device 30 generates the polarization images of three or more polarization directions and proceeds to step ST22.

In step ST22, the image processing device 30 computes an image feature quantity. The image processing device 30 normalizes luminances of the polarization images of three or more polarization directions and designates the normalized luminance as the image feature quantity.

In step ST23, the image processing device 30 performs object recognition. The image processing device 30 divides, for example, an image region into object-specific regions, on the basis of the polarization images acquired in step ST21. Also, the image processing device 30 designates the divided region as a recognition target region and performs object recognition for a recognition target region using an image feature quantity within the recognition target region and teacher data pre-generated by the learning device.

FIG. 21 illustrates the recognition process using the image feature quantity computed on the basis of the polarization image. For example, in the recognition process, physical object recognition, face recognition, hand recognition, human recognition, etc. are performed. The physical object recognition is not limited to general physical object recognition for various physical objects and the recognition of quality of material or a surface shape, the recognition of a metal, etc. can be performed. In the face recognition, personal authentication, facial expression recognition, line-of-sight direction estimation, etc. can be performed. In the hand recognition, finger shape detection, pointing direction estimation, etc. can be performed. Further, in the human recognition, the authentication of a figure of the whole body, pose recognition, etc. can be performed.

The image processing device 30 is configured to precisely perform the recognition process by performing the above-described process. For example, when the feature quantity based on gradient information is used, the identification of an actual face or a face shown in a photo is difficult when the gradient information is similar. However, it is possible to correctly identify the actual face and the face shown in the photo from the fact that the image feature quantity computed using the polarization images of the three or more polarization directions is a feature quantity according to a surface shape of the object. Therefore, the present technology can be applied as security recognition technology.

Also, the image processing device 30 and the learning device 40 may compute the image feature quantity by providing a non-polarization image feature quantity computation unit configured to compute a feature quantity on the basis of gradient information of a non-polarization image as described above.

[3-2. Feature Point Detection]

FIG. 22 illustrates a configuration when the image processing device detects a feature point. The image processing device 50 has the polarization image acquisition unit 11, the feature quantity computation unit 15, and an image processing unit configured to perform image processing using the image feature quantity, for example, a feature point detection unit 51 configured to perform feature point detection.

As described above, the polarization image acquisition unit 11 acquires polarization images of three or more polarization directions. Also, the feature quantity computation unit 15 computes an image feature quantity on the basis of the polarization images acquired by the polarization image acquisition unit 11.

The feature point detection unit 51 divides a region on the basis of the polarization images provided from the polarization image acquisition unit 11. As in the above-described image recognition unit 31, the feature point detection unit 51 divides the image acquired by the polarization image acquisition unit 11 into object-specific regions. Also, the feature point detection unit 51 determines whether a processing target pixel is a feature point on the basis of a difference between an image feature quantity of a processing target pixel in a feature point detection target region and an image feature quantity of a peripheral pixel positioned near the processing target pixel using the divided region as the feature point detection target region.

Figure 23:
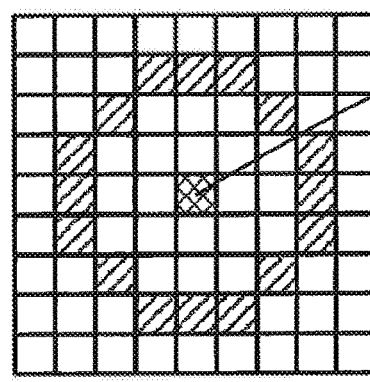
FIG. 23 is a diagram for describing an operation of a feature point detection unit.

FIG. 23 is a diagram for describing an operation of a feature point detection unit. The feature point detection unit 51 illustrates the case in which it is determined whether a processing target pixel Pt is a feature point using image feature quantities of eight adjacent pixels around the processing target pixel Pt. Here, as illustrated in (A) of FIG. 23, a processing target pixel Pt=$P^5$ and peripheral pixels are denoted by $P^1$ to $P^4$ and $P^6$ to $P^9$. Also, the feature quantity computation unit 15 is configured to compute the image feature quantity on the basis of luminances for which the polarization angle υ is 0 degrees, 45 degrees, 90 degrees, and 135 degrees. For example, an image feature quantity of the pixel $P^1$ is designated as [$F^1_{0°}$, $F^1_{45°}$, $F^1_{90°}$, $F^1_{135°}$], . . . , and an image feature quantity of the pixel $P^9$ is designated as [$F^9_{0°}$, $F^9_{45°}$, $F^9_{90°}$, $F^9_{135°}$].

The feature point detection unit 51 computes Formula (10) and computes a determination value S. Here, when the determination value S is greater than a preset threshold value, its point is set as a feature point.

[Math. 9]

$$S = \sum_{1,2,3,4,6,7,8,9}^{p} \sum_{0°,45°,90°,135°}^{d} \text{abs}(F_d^p - F_d^5)^2 \quad (10)$$

Also, as illustrated in (B) of FIG. 23, the feature point detection unit 51 may use image feature quantities of pixels indicated by diagonal lines at circumferential positions around the processing target pixel Pt. In this case, the determination value S is obtained by computing the square sum of differences between image feature quantities of the processing target pixel Pt and the pixels indicated by the diagonal lines.

Figure 24:
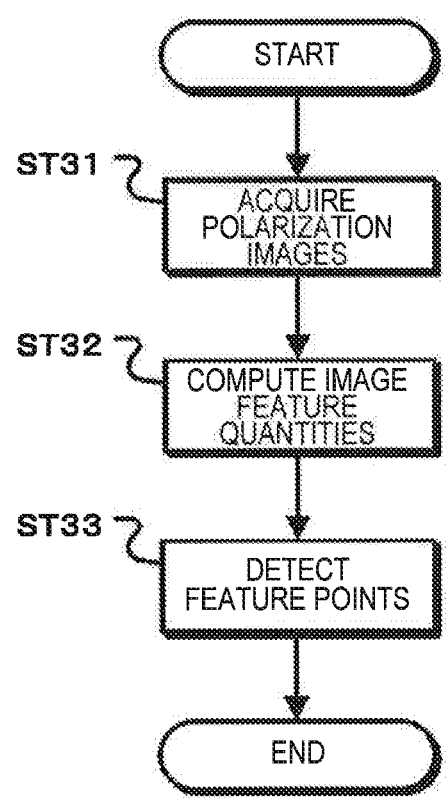
FIG. 24 is a flowchart illustrating an operation of a feature point detection process.

FIG. 24 is a flowchart illustrating an operation of a feature point detection process. In step ST31, the image processing device 50 acquires polarization images. The image processing device 50 generates the polarization images of three or more polarization directions.

In step ST32, the image processing device 50 computes an image feature quantity. The image processing device 50 normalizes luminances of the polarization images of the three or more polarization directions and designates the normalized luminance as the image feature quantity.

In step ST33, the image processing device 50 detects feature points. The image processing device 50 divides, for example, a region on the basis of the polarization images acquired in step ST31 and divides the image into object-specific regions. Also, the image processing device 50 designates the divided region as a feature point detection target region and detects a feature point on the basis of an image feature quantity of the feature point detection target region.

The image processing device 50 is configured to detect a feature point on the basis of the image feature quantity computed from the polarization image by performing the above-described process.

Also, the feature point detection is performed on the basis of the feature quantity computed from the non-polarization image. The image feature quantity is computed using the polarization image only for a region including the detected feature point and the feature point detection may be performed on the basis of the computed image feature quantity. Thus, it is possible to further extract the feature point having a feature in a surface shape from a feature point having a feature in gradient information. Therefore, the detection of a part having a feature as a shape of a face such as a tip of a nose in the face is facilitated. Because the feature point can be detected on the basis of a surface shape of an object, the feature point can be detected by distinguishing the case in which the object is imaged and the case in which the photo of the object is captured.

[3-3. Feature Point Matching]

Figure 25:
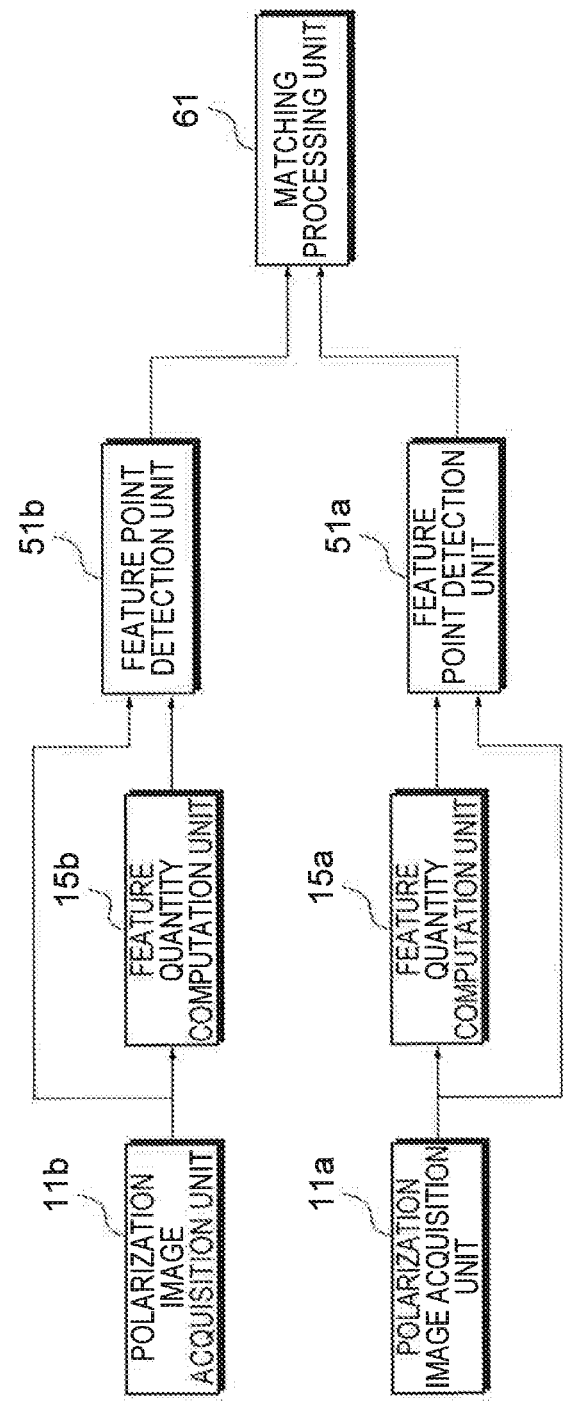
FIG. 25 is a diagram illustrating a configuration when the image processing device performs feature point matching.

FIG. 25 illustrates a configuration when the image processing device performs feature point matching. Also, in FIG. 25, a correspondence point search between polarization images acquired using two polarization image acquisition units may be performed.

The image processing device 60 has polarization image acquisition units 11a and 11b, feature quantity computation units 15a and 15b, an image processing unit configured to perform image processing using an image feature quantity, for example, feature point detection units 51a and 51b configured to perform a feature point detection process, and a matching processing unit 61 configured to perform a matching process using detected feature points.

As described above, the polarization image acquisition units 11a and 11b acquire polarization images of three or more polarization directions. Also, the polarization image acquisition unit 11a acquires one polarization image for use in matching and the polarization image acquisition unit 11b acquires the other polarization image for use in matching. The feature quantity computation unit 15a computes the image feature quantity on the basis of the polarization image acquired by the polarization image acquisition unit 11a. The feature quantity computation unit 15b computes the image feature quantity on the basis of the polarization image acquired by the polarization image acquisition unit 11b. The feature point detection unit 51a performs a process similar to that of the above-described feature point detection unit 51, and the feature point is detected on the basis of the image feature quantity computed by the feature quantity computation unit 15a. The feature point detection unit 51b performs a process similar to that of the above-described feature point detection unit 51, and the feature point is detected on the basis of the image feature quantity computed by the feature quantity computation unit 15b.

Figure 26:
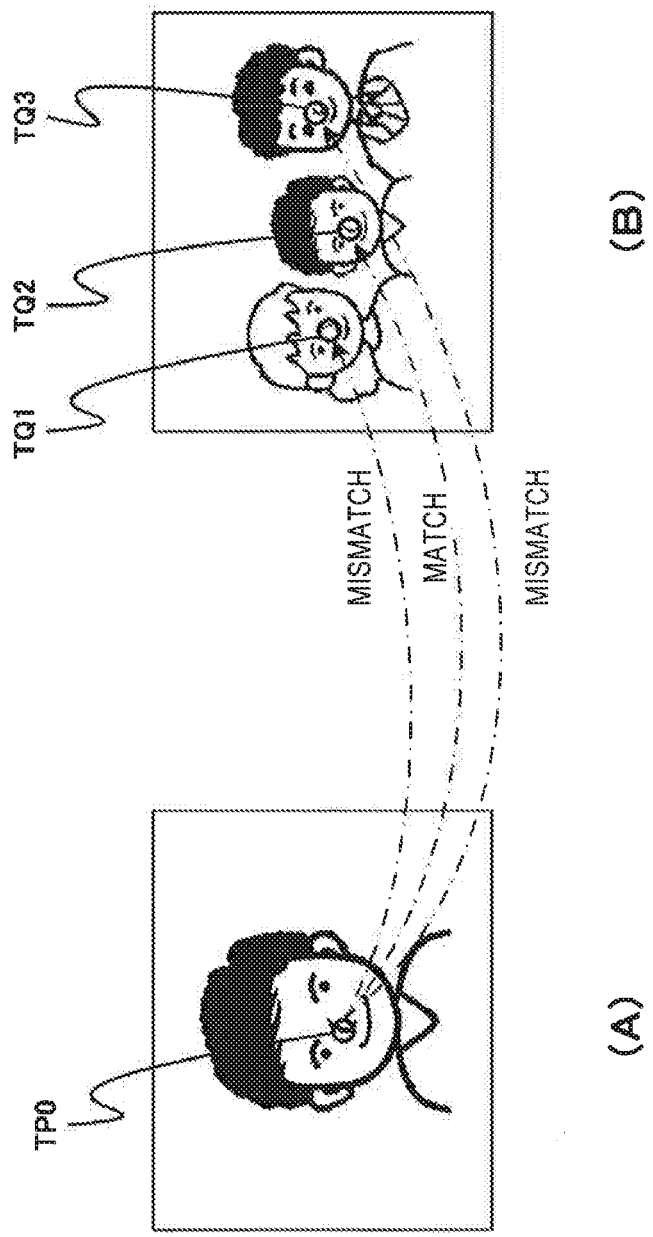
FIG. 26 is a diagram for describing an operation of a matching processing unit.

The matching processing unit 61 determines whether the feature point detected by one of the feature point detection units 51a and 51b matches any one of feature points detected by the other. FIG. 26 is a diagram for describing an operation of the matching processing unit. The feature point matching the feature point of a matching target (hereinafter referred to as a "target feature point") is determined from other feature points using the image feature quantity of the feature point detected by the feature point detection unit 51a and the image feature quantity of the feature point detected by the feature point detection unit 51b. The feature point detection units 51a and 51b detect, for example, the feature points on the basis of image feature quantities computed on the basis of luminances for which the polarization angle υ is 0 degrees, 45 degrees, 90 degrees, and 135 degrees. Here, an image feature quantity of the target feature point TP0 is designated as [$F^o_{0°}$, $F^o_{45°}$, $F^o_{90°}$, $F^o_{135°}$]. An image feature quantity of the other feature point TQj is designated as [$F^j_{0°}$, $F^j_{45°}$, $F^j_{90°}$, $F^j_{135°}$]. Also, "j" is a variable indicating a $j^{th}$ feature point among the other feature points.

The matching processing unit 61 determines a point at which a distance between vectors of image feature quantities is minimized and designates the determined point as a matching point. For example, the matching processing unit 61 determines a feature point j at which the square sum of differences from the image feature quantity of the target feature point is minimized from the other feature points by computing Formula (11) and designates the determined feature point j as a matching point.

[Math. 10]

$$j = \arg_j \min \sum_{0°,45°,90°,135°}^{d} \text{abs}(F^0_d - F^j_d)^2 \quad (11)$$

Figure 27:
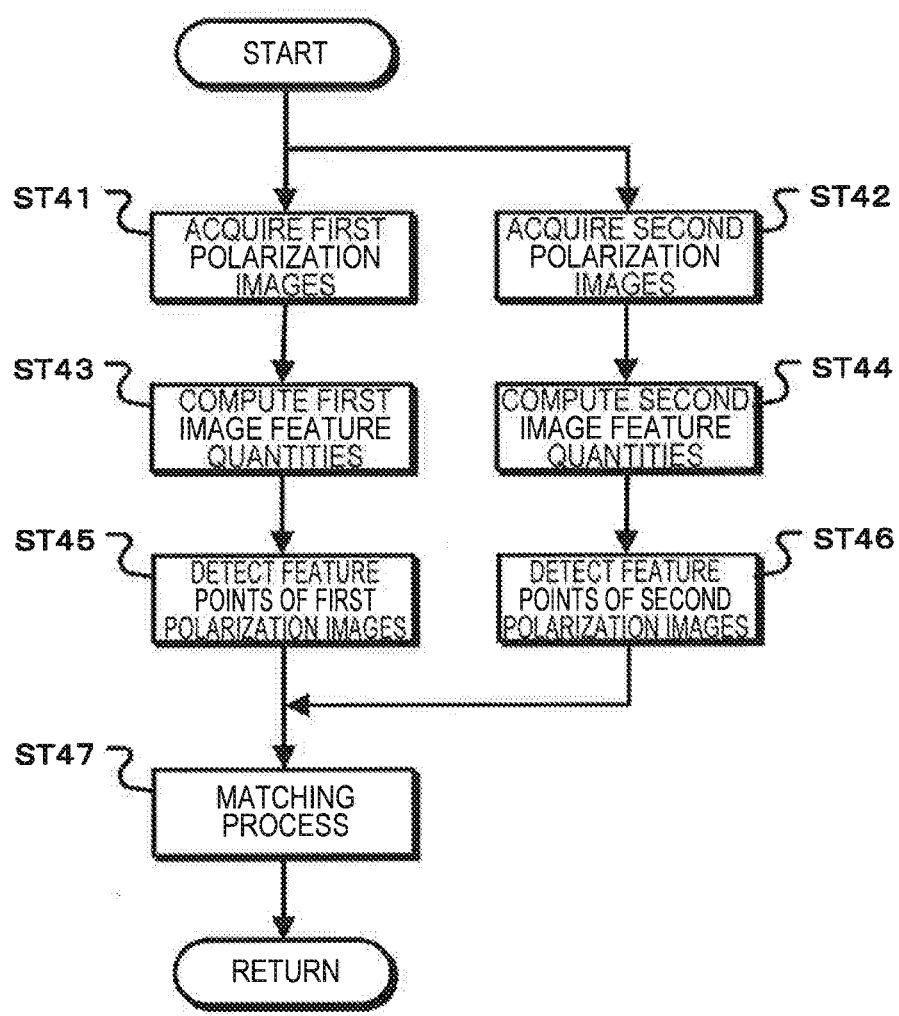
FIG. 27 is a flowchart illustrating an operation of a feature point matching process.

FIG. 27 is a flowchart illustrating an operation of a feature point matching process. In step ST41, the image processing device 60 acquires first polarization images. The image processing device 60 generates first polarization images of three or more polarization directions.

In step ST42, the image processing device 60 acquires second polarization images. The image processing device 60 generates the second polarization images to match the first polarization images. Also, the second polarization images are polarization images of three or more polarization directions like the first polarization images.

In step ST43, the image processing device 60 computes first image feature quantities. The image processing device 60 normalizes the luminances of the first polarization images and designates the normalized luminances as the first image feature quantities.

In step ST44, the image processing device 60 computes second image feature quantities. The image processing device 60 normalizes the luminances of the second polarization images and designates the normalized luminances as the second image feature quantities.

In step ST45, the image processing device 60 detects a feature point of the first polarization image. The image processing device 50 divides, for example, an image region into object-specific regions on the basis of the polarization images acquired in step ST41. Also, the image processing device 60 designates the divided region as a feature point detection target region and detects a feature point on the basis of an image feature quantity of the feature point detection target region.

In step ST46, the image processing device 60 detects a feature point of the second polarization image. The image processing device 60 divides, for example, an image region into object-specific regions on the basis of the polarization images acquired in step ST42. Also, the image processing device 60 designates the divided region as a feature point detection target region and detects a feature point on the basis of an image feature quantity of the feature point detection target region.

In step ST47, the image processing device 60 performs a matching process. The image processing device 60 determines whether a feature point of a matching detection region in one polarization image of the first polarization image and the second polarization image matches a feature point of any region in the other polarization image. The image processing device 60 determines a feature point at which an image feature quantity difference from a feature point of a matching detection region is minimized from a region of the other polarization image and designates the determined feature point as a matching point.

The image processing device 60 can be configured to precisely detect the matching point by performing the above-described process. The computation of parallax for computing depth information, stitching of two images, or the like is easily performed using the detection result of the matching point obtained as described above.

Also, the image processing device 60 may perform feature point detection on the basis of a feature quantity computed from a non-polarization image and may compute an image feature quantity using a polarization image for a detected feature point to perform matching using the computed image feature quantity.

Furthermore, the processing sequence that is explained in the specification can be implemented by hardware, by software and by a configuration that combines hardware and software. In a case where the processing is implemented by software, it is possible to install in memory within a computer that is incorporated into dedicated hardware a program in which the processing sequence is encoded and to execute the program. It is also possible to install a program in a general-purpose computer that is capable of performing various types of processing and to execute the program.

For example, the program can be recorded on a hard disk, SSD (Solid State Drive), or ROM (Read Only Memory) as a recording medium in advance. Alternatively, the program can be temporarily or permanently stored (recorded) in (on) a removable recording medium such as a flexible disk, CD-ROM (Compact Disc Read Only Memory), MO (Magneto Optical) disk, DVD (Digital Versatile Disc), BD (Blu-Ray Disc (registered trademark), a magnetic disk, or a semiconductor memory card. Such a removable recording medium can be provided as so-called package software.

In addition, the program can be, not only installed on a computer from a removable recording medium, but also transferred wirelessly or by wire to the computer from a download site via a network such as a LAN (Local Area Network) or the Internet. In such a computer, a program transferred in the aforementioned manner can be received and installed on a recording medium such as built-in hardware.

The present technology is not interpreted as being limited to the above-described embodiments of the technology. The embodiments of the technology disclose the present technology in the form of exemplification, and it is clear that a person skilled in the art can make modification or substitution of the embodiments without departing from the gist of the present technology. In other words, in order to determine the gist of the present technology, the claims should be considered.

Additionally, the image feature quantity computation device according to the present technology may also be configured as below.

(1)

An image processing device including:

a polarization image acquisition unit configured to acquire a polarization image; and an image processing unit configured to perform image processing using an image feature quantity computed on the basis of the polarization image acquired by the polarization image acquisition unit.

(2)

The image processing device according to (1), wherein the image processing unit performs a process of recognizing an object in the polarization image using the image feature quantity as the image processing.

(3)

The image processing device according to any of (1) and (2), wherein the image processing unit performs a process of detecting a feature point of an object in the polarization image using the image feature quantity as the image processing.

(4)

The image processing device according to any of (1) to (3), wherein the image processing unit performs a matching process with a feature point of an object in the polarization image using the image feature quantity as the image processing.

(5)

The image processing device according to any of (1) to (4), further including:

a feature quantity computation unit configured to compute an image feature quantity using the polarization image acquired by the polarization image acquisition unit.

(6)

The image processing device according to (5), wherein the feature quantity computation unit computes the image feature quantity using luminance of the polarization image for each pixel.

(7)

The image processing device according to (6), wherein the feature quantity computation unit normalizes the luminance and designates the normalized luminance for each polarization direction as the image feature quantity.

(8)

The image processing device according to any of (5) to (7), wherein the feature quantity computation unit uses a feature quantity of a pixel positioned near a feature quantity computation target pixel in computation of the image feature quantity.

(9)

The image processing device according to any of (5) to (8), wherein the feature quantity computation unit computes the image feature quantity on the basis of a reflection characteristic of an object in the polarization image.

(10)

The image processing device according to (9), wherein the feature quantity computation unit computes the image feature quantity on the basis of a ratio between a diffuse reflection component and a specular reflection component.

(11)

The image processing device according to any of (5) to (10), wherein the feature quantity computation unit computes the image feature quantity on the basis of a refractive index of an object in the polarization image.

(12)

The image processing device according to any of (5) to (11), further including:

a non-polarization image feature quantity computation unit configured to generate a non-polarization image from the polarization image acquired by the polarization image acquisition unit and compute a feature quantity on the basis of the non-polarization image, wherein the feature quantity computation unit computes the image feature quantity using information determined when the non-polarization image feature quantity computation unit computes the feature quantity.

(13)

The image processing device according to (12), wherein the non-polarization image feature quantity computation unit computes the feature quantity on the basis of gradient information of the non-polarization image, and wherein the feature quantity computation unit computes the image feature quantity using information based on a gradient strength and a gradient direction determined when the non-polarization image feature quantity computation unit computes the feature quantity.

(14)

The image processing device according to any of (12) to (13), wherein the feature quantity computation unit includes the feature quantity computed by the non-polarization image feature quantity computation unit in the image feature quantity computed using the polarization image.

(15)

The image processing device according to any of (1) to (14), wherein the polarization image acquisition unit acquires a polarization image of three or more polarization directions.

INDUSTRIAL APPLICABILITY

In the image processing device and the image processing method of the present technology, a polarization direction is acquired and image processing is performed using an image feature quantity computed on the basis of the acquired polarization image. Thus, from the fact that the image feature quantity is computed on the basis of the polarization image, the feature of a surface shape of an object can be indicated by an image feature quantity and image processing based on the surface shape of the object is configured to be performed using the image feature quantity. Therefore, the present technology is suitable for an image processing device or the like for performing image processing related to a three-dimensional object.

REFERENCE SIGNS LIST 10, 20 image feature quantity computation device
11, 11a, 11b, 21, 41 polarization image acquisition unit
15, 15a, 15b, 25, 45 feature quantity computation unit
23 non-polarization image feature quantity computation unit
30, 50, 60 image processing device
31 image recognition unit
40 learning device
47 teacher data generation unit
51, 51a, 51b feature point detection unit
61 matching processing unit
110 image sensor
111 polarization filter
112 lens
113 polarizing plate

The invention claimed is:

1. An image processing device for performing image processing based on surface shape of an object, the image processing device comprising:
   circuitry configured to:
      acquire polarization images of three or more different polarization directions; and
      perform image processing using an image feature quantity of each pixel of a plurality of pixels, each image feature quantity having been computed according to the surface shape of the object captured within the acquired polarization images, and including information indicating a feature of the surface shape at a respective position corresponding to a respective pixel of the object captured within the acquired polarization images, wherein the circuitry is further configured to compute image feature quantities using the acquired polarization images, generate a non-polarization image from the acquired polarization images and compute a feature quantity on the basis of the non-polarization image, and compute the image feature quantities using information determined when the feature quantity is computed, and wherein the image feature quantity of a target pixel of the plurality of pixels is computed using the image feature quantity of an adjacent pixel located in a vicinity of the target pixel.

2. The image processing device according to claim 1, wherein the circuitry performs a process of recognizing the object in the polarization images using the image feature quantities as the image processing.

3. The image processing device according to claim 1, wherein the circuitry performs a process of detecting a feature point of the object in the polarization images using the image feature quantities as the image processing.

4. The image processing device according to claim 1, wherein the circuitry performs a matching process with a feature point of the object in the polarization images using the image feature quantities as the image processing.

5. The image processing device according to claim 1, wherein the circuitry computes the image feature quantities using luminance of the polarization images for each pixel.

6. The image processing device according to claim 5, wherein the circuitry normalizes the luminance and designates the normalized luminance for each polarization direction as an image feature quantity.

7. The image processing device according to claim 1, wherein the circuitry computes the image feature quantities on the basis of a reflection characteristic of the object in the polarization images.

8. The image processing device according to claim 7, wherein the circuitry computes the image feature quantities on the basis of a ratio between a diffuse reflection component and a specular reflection component.

9. The image processing device according to claim 1, wherein the circuitry computes the image feature quantities on the basis of a refractive index of the object in the polarization images.

10. The image processing device according to claim 1, wherein the circuitry computes the feature quantity on the basis of gradient information of the non-polarization image, and wherein the circuitry computes the image feature quantities using information based on a gradient strength and a gradient direction determined when the feature quantity is computed.

11. The image processing device according to claim 1, wherein the circuitry includes the computed feature quantity in the image feature quantities computed using the polarization images.

12. An image processing method for performing image processing based on surface shape of an object, the image processing method comprising:

acquiring polarization images of three or more different polarization directions; and performing image processing using an image feature quantity of each pixel of a plurality of pixels, each image feature quantity having been computed according to the surface shape of the object captured within the acquired polarization images, and including information indicating a feature of the surface shape at a respective position corresponding to a respective pixel of the object captured within the acquired polarization images, wherein image feature quantities are computed using the acquired polarization images, a non-polarization image is generated from the acquired polarization images and a feature quantity is computed on the basis of the non-polarization image, and the image feature quantities are computed using information determined when the feature quantity is computed, and wherein the image feature quantity of a target pixel of the plurality of pixels is computed using the image feature quantity of an adjacent pixel located in a vicinity of the target pixel.

13. A non-transitory computer-readable medium having embodied thereon a program, which when executed by a computer causes the computer to execute a method, the method comprising:

acquiring polarization images of three or more different polarization directions; and performing image processing using an image feature quantity of each pixel of a plurality of pixels, each image feature quantity having been computed according to the surface shape of the object captured within the acquired polarization images, and including information indicating a feature of the surface shape at a respective position corresponding to a respective pixel of the object captured within the acquired polarization images, wherein image feature quantities are computed using the acquired polarization images, a non-polarization image is generated from the acquired polarization images and a feature quantity is computed on the basis of the non-polarization image, and the image feature quantities are computed using information determined when the feature quantity is computed, and wherein the image feature quantity of a target pixel of the plurality of pixels is computed using the image feature quantity of an adjacent pixel located in a vicinity of the target pixel.

* * * * *